United States Patent
Yamashita et al.

(10) Patent No.: US 9,561,783 B2
(45) Date of Patent: Feb. 7, 2017

(54) BRAKING APPARATUS FOR VEHICLE WITH COLLISION AVOIDANCE MECHANISM

(71) Applicants: DENSO CORPORATION, Kariya, Aichi-pref. (JP); Advics Co., Ltd., Kariya, Aichi-pref. (JP)

(72) Inventors: Hironobu Yamashita, Aichi-ken (JP); Takahiro Yamaguchi, Kariya (JP); Kiyohito Takeuchi, Kariya (JP); Yasuhiro Sasaki, Okazaki (JP); Junji Ishimura, Kariya (JP); Atsushi Suzuki, Nagoya (JP)

(73) Assignees: DENSO CORPORATION, Kariya, Aichi-pref. (JP); ADVICS CO., LTD., Kariya, Aichi-pref. (JP)

(*) Notice: Subject to any disclaimer, the term of this patent is extended or adjusted under 35 U.S.C. 154(b) by 73 days.

(21) Appl. No.: 14/606,485

(22) Filed: Jan. 27, 2015

(65) Prior Publication Data

US 2015/0210256 A1  Jul. 30, 2015

(30) Foreign Application Priority Data

Jan. 29, 2014  (JP) ................................. 2014-014194

(51) Int. Cl.
*B60T 7/22* (2006.01)
*B60T 13/14* (2006.01)
(Continued)

(52) U.S. Cl.
CPC ................ *B60T 7/22* (2013.01); *B60T 7/042* (2013.01); *B60T 8/4845* (2013.01); *B60T 11/18* (2013.01);
(Continued)

(58) Field of Classification Search
CPC .................... B60T 2201/022; B60T 2201/024; B60T 7/22; B60T 8/17558; B60T 13/147
See application file for complete search history.

(56) References Cited

U.S. PATENT DOCUMENTS 4,159,854 A * 7/1979 Peterson ................. B60T 8/265
                                                              137/636
5,934,326 A * 8/1999 Kawase ................. B60T 8/341
                                                              137/869

(Continued)

FOREIGN PATENT DOCUMENTS

JP      2006-168629      6/2006
JP      2011-240872      12/2011
(Continued)

*Primary Examiner* — Thomas J Williams
*Assistant Examiner* — James Hsiao
(74) *Attorney, Agent, or Firm* — Harness, Dickey & Pierce, P.L.C.

(57) ABSTRACT

A braking apparatus for a vehicle is provided which includes a hydraulic booster to make wheels of the vehicle produce frictional braking force, a solenoid valve, and a collision avoidance controller. The solenoid valve selectively exerts the hydraulic pressure of brake fluid stored in an accumulator on a spool valve in the booster. When determining that there is a risk of a collision with an obstacle, the collision avoidance controller opens the solenoid valve to achieve emergency braking to minimize the risk of the collision. Basically, emergency braking is achieved by installing the solenoid valve to selectively exert the hydraulic pressure on the spool valve, thus allowing an emergency avoidance braking system to be constructed with a minimum of equipment and facilitating the mountability of the braking apparatus in the vehicles.

9 Claims, 16 Drawing Sheets

(51) Int. Cl.
*B60T 13/68* (2006.01)
*B60T 8/48* (2006.01)
*B60T 7/04* (2006.01)
*B60T 11/18* (2006.01)
*B60T 13/66* (2006.01)

(52) U.S. Cl.
CPC ............ *B60T 13/147* (2013.01); *B60T 13/662* (2013.01); *B60T 13/686* (2013.01); *B60T 2201/022* (2013.01)

(56) References Cited

U.S. PATENT DOCUMENTS

| | | | | |
|---|---|---|---|---|
| 5,941,608 A * | 8/1999 | Campau | ............... | B60T 7/042 303/113.4 |
| 6,272,418 B1 * | 8/2001 | Shinmura | ............... | B60T 7/22 303/146 |
| 6,378,961 B1 * | 4/2002 | Hara | ............... | B60T 7/22 180/169 |
| 6,533,366 B1 * | 3/2003 | Barron | ............... | B60T 8/346 251/11 |
| 6,652,041 B2 * | 11/2003 | Nishikimi | ............... | B60T 8/326 303/117.1 |
| 6,782,796 B2 * | 8/2004 | Nakano | ............... | B60T 8/00 60/591 |
| 8,376,473 B2 * | 2/2013 | Isono | ............... | B60T 8/328 188/358 |
| 8,775,047 B2 * | 7/2014 | Breuer | ............... | B60T 7/22 340/435 |
| 9,050,121 B2 * | 6/2015 | Doyle | ............... | F15B 13/0402 |
| 2002/0022919 A1 * | 2/2002 | Hara | ............... | B60T 7/22 701/70 |
| 2003/0085613 A1 * | 5/2003 | Nakano | ............... | B60T 8/00 303/114.1 |
| 2009/0152941 A1 * | 6/2009 | Isono | ............... | B60T 13/686 303/114.1 |
| 2013/0057054 A1 | 3/2013 | Ishida | | |
| 2013/0207451 A1 * | 8/2013 | Ohkubo | ............... | B60T 8/3655 303/9.62 |
| 2013/0234501 A1 * | 9/2013 | Leiber | ............... | B60T 8/4018 303/10 |
| 2015/0001919 A1 | 1/2015 | Murayama et al. | | |

FOREIGN PATENT DOCUMENTS

JP 2012-092776 5/2012
JP 2015-027862 2/2015

* cited by examiner

FIG.3 PRESSURE-REDUCING MODE

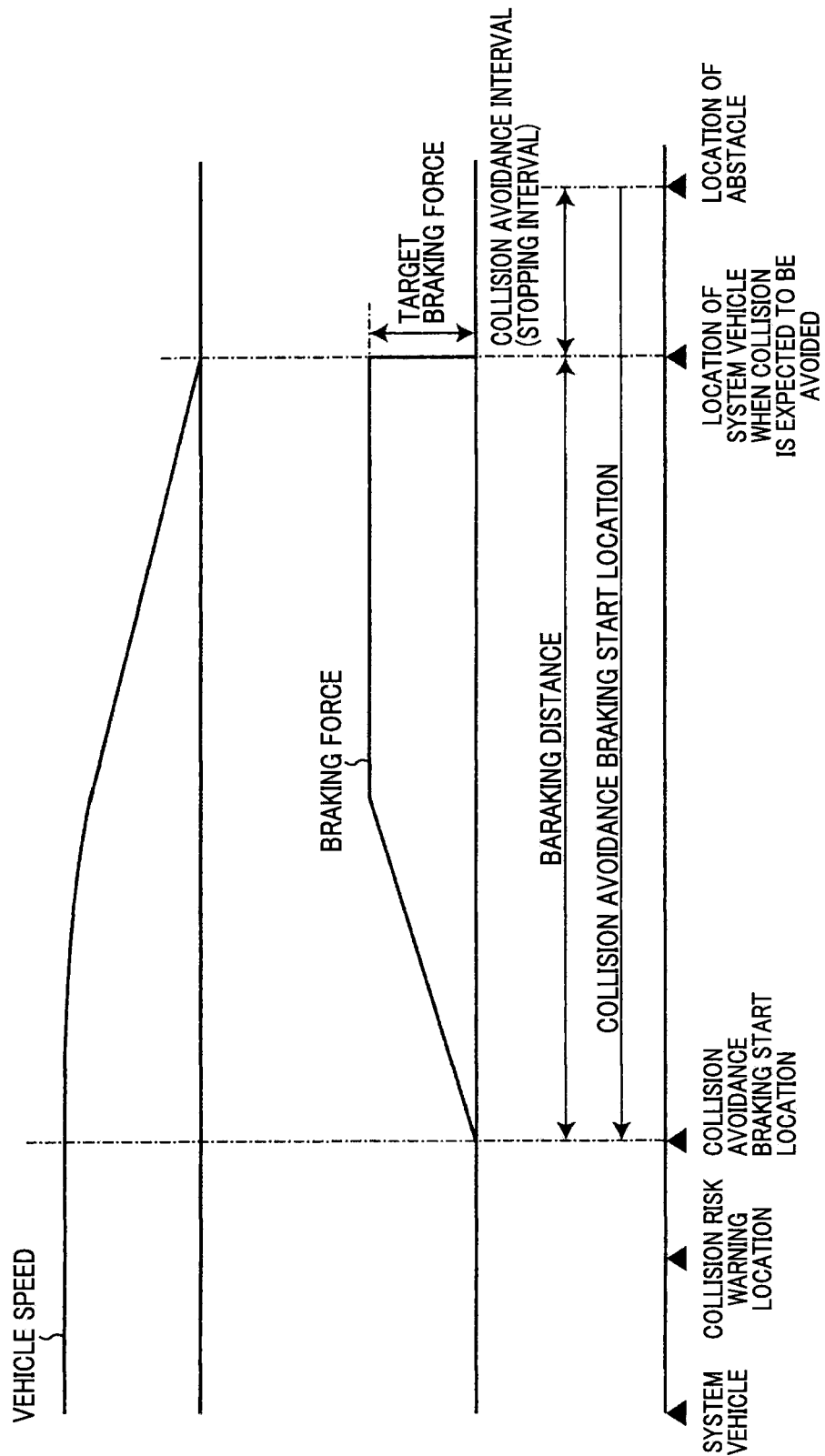

FIG.13 PRESSURE-INCREASING MODE (COLLISION AVOIDANCE BRAKING MODE)

COLLISION AVOIDANCE BRAKING ACHIEVED BY 1st AND 2nd SOLENOID VALVES

BRAKING FORCE

RATE OF INCREASE IN BRAKING FORCE

COLLISION AVOIDANCE BRAKING ACHIEVED BY PRESSURE REGULATOR

COLLISION AVOIDANCE BRAKING ACHIEVED BY NON-LINEAR 1st SOLOENOID VALVE

BRAKING FORCE

UNCONTROLLABLE RANGE

RATE OF INCREASE IN BRAKING FORCE

BRAKING APPARATUS FOR VEHICLE WITH COLLISION AVOIDANCE MECHANISM

CROSS REFERENCE TO RELATED DOCUMENT

The present application claims the benefit of priority of Japanese Patent Application No. 2014-14194 filed on Jan. 29, 2014, the disclosure of which is incorporated herein by reference.

BACKGROUND OF THE INVENTION

1. Technical Field

This disclosure relates generally to a braking apparatus for vehicles which works to control braking force applied to, for example, an automobile.

2. Background Art

Japanese Patent First Publication No. 2012-192776 has proposed a collision avoidance system which works to automatically brake a vehicle to avoid an accident with an obstacle present ahead of the vehicle when it is determined that there is a probability of collision with it.

Japanese Patent First Publication No. 2011-240872 teaches a brake system for automobiles which is equipped with a brake simulator and a hydraulic booster. The brake simulator works to imitate an operation of a typical brake system, that is, make the driver of the vehicle experience the sense of depression of a brake pedal. The hydraulic booster serves to create a master pressure using the pressure of brake fluid in an accumulator in response to depression of the brake pedal. The master pressure is delivered to friction braking devices installed in the vehicle.

The collision avoidance system, as taught in the former publication, is expected to be used with a typical automotive brake system. The former publication is silent about how to employ the collision avoidance system with the hydraulic booster. A combination of the collision avoidance system and the hydraulic booster, therefore, would result in increased number of solenoid valves, hydraulic pipes, or control mechanism making up the brake system to achieve the collision avoidance, thus leading to lowered mountability of the brake system in automotive vehicles.

SUMMARY

It is therefore an object to provide a braking apparatus with a collision avoidance system which is easy to mount in a vehicle.

According to one aspect of this disclosure, there is provided a braking apparatus for a vehicle such as an automobile. The braking apparatus comprises: (a) a master cylinder having a length with a front and a rear, the master cylinder including a cylindrical cavity extending in a longitudinal direction of the master cylinder; (b) an accumulator which connects with the cylindrical cavity of the master cylinder and in which hydraulic pressure of brake fluid is stored; (c) a reservoir which connects with the cylindrical cavity of the master cylinder and in which the brake fluid is stored; (d) a master piston which is disposed in the cylindrical cavity of the master cylinder to be slidable in the longitudinal direction of the master cylinder, the master piston having a front oriented toward the front of the master cylinder and a rear oriented to the rear of the master cylinder, the master piston defining a master chamber and a servo chamber within the cylindrical cavity, the master chamber being formed on a front side of the master piston and storing therein the brake fluid to be delivered to a friction braking device working to apply a frictional braking force to a wheel of a vehicle equipped with this braking apparatus, the servo chamber being formed on a rear side of the master piston; (e) a spool valve which is disposed on the rear side of the master piston within the cylindrical cavity of the master cylinder to be slidable in the longitudinal direction of the master cylinder in response to an effort, as produced by a driver of the vehicle, on a brake pedal so as to switch among a pressure-reducing mode, a pressure-increasing mode, and a pressure-holding mode, the pressure-reducing mode being to establish fluid communication between the servo chamber and the reservoir, the pressure-increasing mode being to establish fluid communication between the servo chamber and the accumulator, the pressure-holding mode being to hermetically close the servo chamber; (f) a first solenoid valve which switches between a pressure exerting mode and a non-pressure exerting mode, the pressure exerting mode being to exert the hydraulic pressure of the brake fluid stored in the accumulator on the spool valve, the non-pressure exerting mode being not to exert the hydraulic pressure of the brake fluid stored in the accumulator on the spool valve; and (g) a collision avoidance controller which works to determine whether there is a risk of a collision of the vehicle equipped with this braking apparatus with an obstacle or not. When it is determined that there is the risk of the collision, the collision avoidance controller opens the first solenoid valve to move the spool valve so as to establish the pressure-increasing mode for creating the frictional braking force applied to the wheel.

When it is determined that there is the risk of collision with the obstacle, the collision avoidance controller opens the first solenoid valve. This causes the hydraulic pressure of the brake fluid, as delivered from the accumulator, to move the spool valve to a location where the pressure-increasing mode is established, thereby developing the braking force in the friction braking device. Basically, emergency braking is achieved by installing the first solenoid valve to selectively exert the hydraulic pressure of the brake fluid stored in the accumulator on the spool valve, thus allowing an emergency avoidance braking system to be constructed with a minimum of equipment and facilitating the mountability of the braking apparatus in the vehicles.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 11 is a view which represents a relation between a speed of a vehicle and a braking force in a collision avoidance braking mode of the braking apparatus of FIG. 2;

DESCRIPTION OF THE PREFERRED EMBODIMENTS

Figure 1:
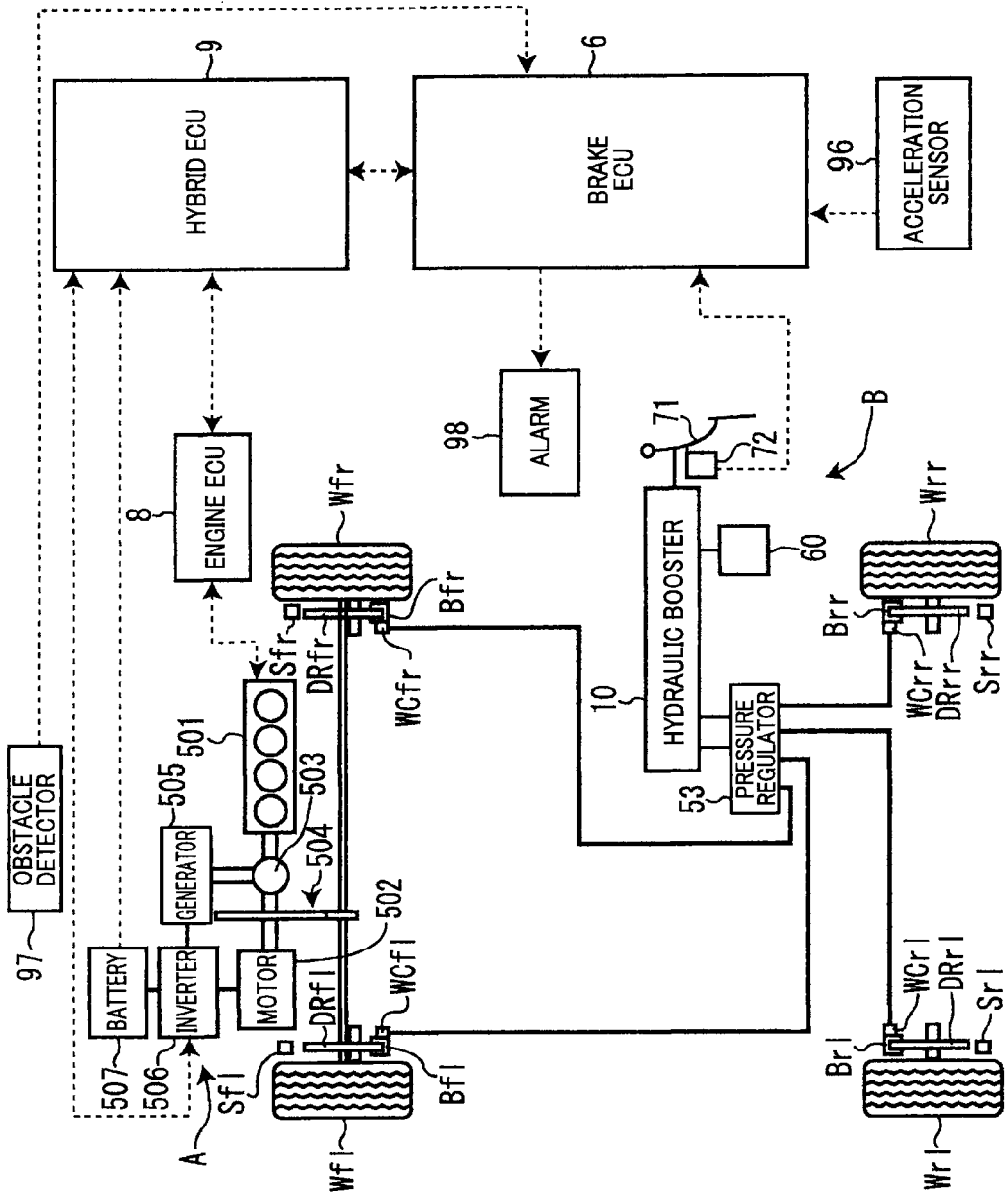
FIG. 1 is a block diagram which illustrates a hybrid vehicle in which a braking apparatus according to an embodiment is mounted.

Referring to the drawings, wherein like reference numbers refer to like or equivalent parts in several views, particularly to FIG. 1, there is shown a brake system (i.e., a braking apparatus) B for vehicles such as automobiles according to an embodiment. The drawings are merely schematic views which do not necessarily illustrate dimensions of parts of the brake system B precisely.

Hybrid Vehicle

The brake system B, as referred to herein, is engineered as a friction brake unit mounted in a hybrid vehicle. The hybrid vehicle is equipped with a hybrid system to drive wheels, for example, front left and right wheels Wfl and Wfr. The hybrid vehicle also includes a brake ECU (Electronic Control Unit) 6, an engine ECU (Electronic Control Unit) 8, a hybrid ECU (Electronic Control Unit) 9, a hydraulic booster 10, a pressure regulator 53, a hydraulic pressure generator 60, a brake pedal (i.e., a brake actuating member) 71, a brake sensor 72, a first solenoid valve 91 (see FIG. 2), and a second solenoid valve 92 (see FIG. 2), an obstacle detector 97, a warning device 98, an internal combustion engine 501, an electric motor 502, a power pushing member 40, a split device 503, a power transmission device 504, an inverter 506, and a storage battery 507.

The brake system B (i.e., the friction brake unit) is essentially made up of the brake ECU 6, the hydraulic booster 10, the pressure regulator 53, the hydraulic pressure generator 60, the brake pedal 71, the brake sensor 72, the first solenoid valve 91, the second solenoid valve 92, the obstacle detector 97, and the warning device 98.

The output power of the engine 501 is transmitted to the driven wheels through the power split device 503 and the power transmission device 504. The output power of the motor 502 is also transmitted to the driven wheels through the power transmission device 504.

The inverter 506 works to achieve conversion of voltage between the motor 502 or an electric generator 505 and the battery 507. The engine ECU 8 works to receive instructions from the hybrid ECU 9 to control the power, as outputted from the engine 501. The hybrid ECU 9 serves to control operations of the motor 502 and the generator 505 through the inverter 506. The hybrid ECU 9 is connected to the battery 507 and monitors the state of charge (SOC) of and current charged in the battery 507.

A combination of the generator 505, the inverter 506, and the battery 507 makes a regenerative braking system A. The regenerative braking system A works to make the wheel Wfl and Wfr produce a regenerative braking force as a function of an actually producible regenerative braking force, which will be described later in detail. The motor 502 and the generator 505 are illustrated in FIG. 1 as being separate parts, but their operations may be achieved by a single motor/generator.

Friction braking devices Bfl, Bfr, Brl, and Brr are disposed near the wheels Wfl, Wfr, Wrl, and Wrr of the vehicle. The friction braking device Bfl includes a brake disc DRfl and a brake pad (not shown). The brake disc DRfl rotates along with the wheel Wfl. The brake pad is of a typical type and pressed against the brake disc DRfl to produce a friction braking power. Similarly, the friction braking devices Bfr, Brl, and Brr are made up of brake discs DRfl, DRfr, DRrl, and DRrr and brake pads (not shown), respectively, and identical in operation and structure with the friction braking device Bfl. The explanation thereof in detail will be omitted here. The friction braking devices Bfl, Bfr, Brl, and Brr also include wheel cylinders WCfl, WCfr, WCri, and WCrr, respectively, which are responsive to a master pressure (which is also called master cylinder pressure) that is hydraulic pressure, as developed by the hydraulic booster 10, required to press the brake pads against the brake discs DRfl, DRfr, DRrl, and DRrr, respectively.

Wheel speed sensors Sfl, Sfr, Srl, and Srr are disposed adjacent the wheels Wfl, Wfr, Wrl, and Wrr of the vehicle. Each of the wheel speed sensors Sfl, Sfr, Srl, and Srr works to output a pulse signal of a frequency as a function of rotational speed of a corresponding one of the wheels Wfl, Wfr, Wrl, and Wrr to the brake ECU 6.

The brake sensor 72 measures the amount of stroke, or position of the brake pedal 71 depressed by the vehicle operator or driver and outputs a signal indicative thereof to the brake ECU 6. The brake ECU 6 calculates a braking force, as required by the vehicle driver, as a function of the signal outputted from the brake sensor 72. The brake ECU 6 calculates a target regenerative braking force as a function of the required braking force and outputs a signal indicative of the target regenerative braking force to the hybrid ECU 9. The hybrid ECU 9 calculates the actually producible regenerative braking force as a function of the target regenerative braking force and outputs a signal indicative thereof to the brake ECU 6.

The acceleration sensor 96 is connected to the brake ECU 6. The acceleration sensor 96 measures the degree of acceleration of the vehicle and outputs a signal indicative thereof to the brake ECU 6. The obstacle detector 97 is implemented by a stereo camera, a millimeter-wave radar, or an infrared radar to detect an obstacle present ahead of the vehicle. The obstacle detector 97 is mounted in front of a driver's seat or a bumper of the vehicle and oriented forward from the vehicle.

The brake ECU 6 analyzes the output from the obstacle detector 97 to determine whether there is a probability that the vehicle equipped with the brake system B (which will also be referred to as a system vehicle below) will collide with the obstacle or not. Specifically, the brake ECU 6 calculates the speed and acceleration of the system vehicle using outputs from the wheel speed sensors Sfl, Sfr, Srl, and Srr. Next, the brake ECU 6 calculates the distance between the system vehicle and the obstacle using the output from the obstacle detector 97 and also determines the speed and acceleration of the obstacle when it is determined that the obstacle tracked by the obstacle detector 97 is a vehicle preceding the system vehicle.

Subsequently, the brake ECU 6 calculates the speed and acceleration of the system vehicle relative to the obstacle tracked by the obstacle detector 97. The brake ECU 6 analyzes the distance to the obstacle, the relative speed, and the relative acceleration of the system vehicle to decide whether there is a possibility that the system vehicle will collide with the obstacle or not.

How to determine the probability of collision with an obstacle is taught in, for example, Japanese Patent First Publication Nos. 2006-168629 and 2012-192776, disclosures of which are incorporated herein by reference.

The warning device 98 is implemented by a speaker, a display, and/or a warning lamp and serves to inform the driver of the vehicle of the risk of collision with an obstacle.

Hydraulic Pressure Generator

The structure and operation of the hydraulic pressure generator 60 will be described in detail with reference to FIG. 2. The hydraulic pressure generator 60 works to produce an accumulator pressure and includes an accumulator 61, a hydraulic pressure pump 62, and a pressure sensor 65.

The accumulator 61 stores therein brake fluid under pressure. Specifically, the accumulator 61 stores accumulator pressure that is the hydraulic pressure of the brake fluid, as created by the hydraulic pressure pump 62. The accumulator 61 connects with the pressure sensor 65 and the hydraulic pressure pump 62 through a pipe 66. The hydraulic pressure pump 62 connects with a reservoir 19. The hydraulic pressure pump 62 is driven by an electric motor 63 to deliver the brake fluid from the reservoir 19 to the accumulator 61.

The pressure sensor 65 works to measure the accumulator pressure that is the pressure in the accumulator 61. When the accumulator pressure is determined through the pressure sensor 65 to have dropped below a given value, the brake ECU 6 outputs a control signal to actuate the motor 63.

Hydraulic Booster

The structure and operation of the hydraulic booster 10 will be described below with reference to FIG. 2. The hydraulic booster 10 works as a pressure generator to regulate the accumulator pressure, as developed by the hydraulic pressure generator 60, as a function of the stroke of (i.e., a driver's effort on) the brake pedal 71 to produce a servo pressure which is, in turn, used to generate the master pressure.

The hydraulic booster 10 includes a master cylinder 11, a fail-safe cylinder 12, a first master piston 13, a second master piston 14, an input piston 15, an operating rod 16, a first return spring 17, a second return spring 18, a reservoir 19, a stopper 21, a mechanical relief valve 22, a spool piston 23, a spool cylinder 24, a spool spring 25, a simulator spring 26, a pedal return spring 27, a movable member 28, a first spring retainer 29, a second spring retainer 30, a connecting member 31, a movable member 32, a retaining piston 33, a simulator rubber 34 serving as a cushion, a spring retainer 35, a fail-safe spring 36, a damper 37, a first spool spring retainer 38, a second spring retainer 39, a pushing member 40, and sealing members 41 to 49.

In the following discussion, a part of the hydraulic booster 10 where the first master piston 13 is disposed will be referred to as the front of the hydraulic booster 10, while a part of the hydraulic booster 10 where the operating rod 16 is disposed will be referred to as the rear of the hydraulic booster 10. An axial direction (i.e., a lengthwise direction) of the hydraulic booster 10, thus, represents a front-back direction of the hydraulic booster 10.

The master cylinder 11 is of a hollow cylindrical shape which has a bottom 11a on the front of the hydraulic booster 10 and an opening defining the rear of the hydraulic booster 10. The master cylinder 11 has a given length aligned with the length of the hydraulic booster 10, a front end (i.e. the bottom 11a), and a rear end (i.e., the opening) at the rear of the hydraulic booster 10. The master cylinder 11 also has a cylindrical cavity 11p extending in the lengthwise or longitudinal direction thereof. The master cylinder 11 is installed in the vehicle. The master cylinder 11 has a first port 11b, a second port 11c, a third port 11d, a fourth port 11e, a fifth port 11f (i.e., a supply port), a sixth port 11g, and a seventh port 11h all of which communicate with the cylindrical cavity 11p and which are arranged in that order from the front to the rear of the master cylinder 11. The second port 11c, the fourth port 11e, the sixth port 11g, and the seventh port 11h connect with the reservoir 19 in which the brake fluid is stored. The reservoir 19, thus, communicates with the cylindrical cavity 11p of the master cylinder 11.

The sealing members 41 and 42 are disposed in annular grooves formed in an inner peripheral wall of the master cylinder 11 across the second port 11c. The sealing members 41 and 42 are in hermetic contact with an entire outer circumference of the first master piston 13. Similarly, the sealing members 43 and 44 are disposed in annular grooves formed in the inner peripheral wall of the master cylinder 11 across the fourth port 11e. The sealing members 43 and 44 are in hermetic contact with an entire outer circumference of the second master piston 14.

The sealing members 45 and 46 are disposed in annular grooves formed in the inner peripheral wall of the master cylinder 11 across the fifth port 11f. The sealing members 45 and 46 are in hermetic contact with entire outer circumferences of a first cylindrical portion 12b and a second cylindrical portion 12c of the fail-safe cylinder 12, as will be described later in detail. The sealing member 47 is disposed in an annular groove formed in the inner peripheral wall of the master cylinder 11 behind the sealing member 46 in hermetic contact with the entire outer circumference of the second cylindrical portion 12c. Similarly, the sealing members 48 and 49 are disposed in annular grooves formed in the inner peripheral wall of the master cylinder 11 across the seventh port 11h. The sealing members 48 and 49 are in hermetic contact with the entire outer circumference of the second cylindrical portion 12c of the fail-safe cylinder 12.

Figure 3:
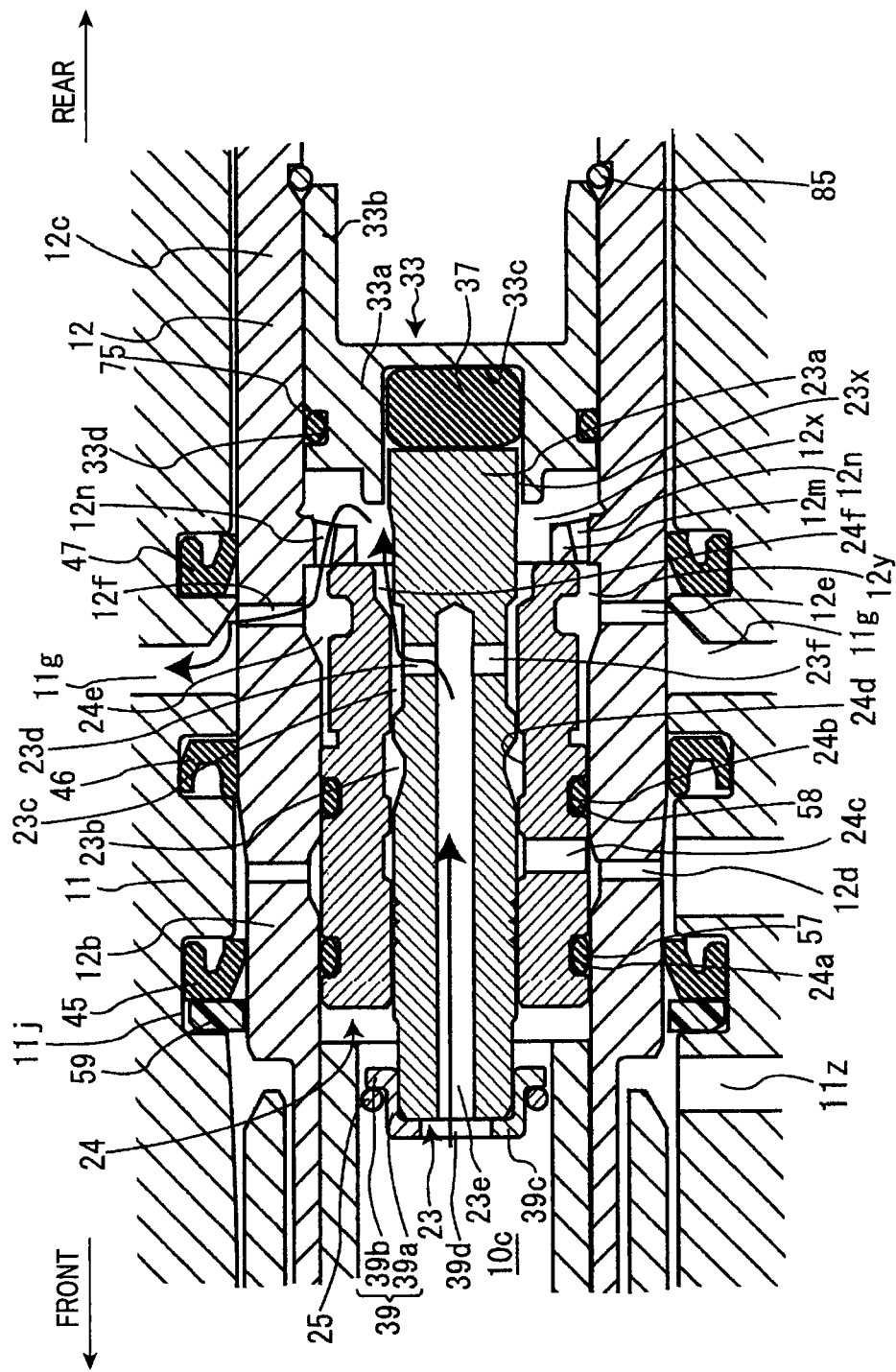
FIG. 3 is an enlarged view of a spool piston and a spool cylinder of a hydraulic booster of the braking apparatus of FIG. 2 in a pressure-reducing mode.

A support member 59 is disposed on the front surface of the sealing member 45. The sealing member 45 and the support member 59 are installed in a common retaining groove 11j formed in the inner wall of the master cylinder 11. The sealing member 45 and the support member 59 are, as clearly illustrated in FIG. 3, placed in abutment contact with each other. The support member 59 is of a ring shape and has a slit 59a formed therein. The support member 59 is made of elastic material such as resin and has, as illustrated in FIG. 3, an inner peripheral surface in contact with the outer circumferential surface of the first cylindrical portion 12b of the fail-safe cylinder 12 which will be described later in detail.

Referring back to FIG. 2, the fifth port 11f works as a supply port which establishes a fluid communication between the outer periphery of the master cylinder 11 and the cylindrical cavity 11p. The fifth port 11f connects with the accumulator 61 through a pipe 67 defining a flow path. In other words, the accumulator 61 communicates with the cylindrical cavity 11p of the master cylinder 11, so that the accumulator pressure is supplied to the fifth port 11f.

The fifth port 11f and the sixth port 11g communicate with each other through a connecting fluid path 11k in which a mechanical relief valve 22 is mounted. The mechanical relief valve 22 works to block a flow of the brake fluid from the sixth port 11g to the fifth port 11f and allow a flow of the brake fluid from the fifth port 11f to the sixth port 11g when the pressure in the fifth port 11f rises above a given level.

The first master piston 13 is disposed in a front portion of the cylindrical cavity 11p of the master cylinder 11, that is, located behind the bottom 11a, so that it is slidable in the longitudinal direction of the cylindrical cavity 11p. The first master piston 13 is of a bottomed cylindrical shape and made up of a hollow cylindrical portion 13a and a cup-shaped retaining portion 13b extending behind the cylindrical portion 13a. The retaining portion 13b is fluidically isolated from the cylindrical portion 13a. The cylindrical portion 13a has fluid holes 13c formed therein. The cylindrical cavity 11p includes a first master chamber 10a located in front of the retaining portion 13b. Specifically, the first master cylinder 10a is defined by the inner wall of the master cylinder 11, the cylindrical portion 13a, and the retaining portion 13b. The first port 11b communicates with the first master chamber 10a. The first master chamber 10a is filled with the brake fluid which is supplied to the wheel cylinders WCfl, WCfr, WCrl, and WCrr.

The first return spring 17 is disposed between the bottom 11a of the master cylinder 11 and the retaining portion of the first master piston 13. The first return spring 17 urges the first master piston 13 backward to place the first master piston 13 at an initial position, as illustrated in FIG. 2, unless the brake pedal 71 is depressed by the vehicle driver.

When the first master piston 13 is in the initial position, the second port 11c coincides or communicates with the fluid holes 13c, so that the reservoir 19 communicates with the first master chamber 10a. This causes the brake fluid to be delivered from the reservoir 19 to the first master chamber 10a. An excess of the brake fluid in the first master chamber 10a is returned back to the reservoir 19. When the first master piston 13 travels frontward from the initial position, it will cause the second port 11c to be blocked by the cylindrical portion 13a, so that the first master chamber 10a is closed hermetically to create the master pressure therein.

The second master piston 14 is disposed in a rear portion of the cylindrical cavity 11p of the master cylinder 11, that is, located behind the first master piston 13, so that it is slidable in the longitudinal direction of the cylindrical cavity 11p. The second master piston 14 is made up of a first cylindrical portion 14a, a second cylindrical portion 14b lying behind the first cylindrical portion 14a, and a retaining portion 14c formed between the first and second cylindrical portions 14a and 14b. The retaining portion 14c fluidically isolates the first and second cylindrical portions 14a and 14b from each other. The first cylindrical portion 14a has fluid holes 14d formed therein.

The cylindrical cavity 11p includes a second master chamber 10b located in front of the retaining portion 14b. Specifically, the second master cylinder 10b is defined by the inner wall of the master cylinder 11, the first cylindrical portion 14a, and the retaining portion 14c. The third port 11d communicates with the second master chamber 10b. The second master chamber 10b is filled with the brake fluid which is supplied to the wheel cylinders WCfl, WCfr, WCrl, and WCrr. The second master chamber 10b defines a master chamber within the cylindrical cavity 11p along with the first master chamber 10a.

The second return spring 18 is disposed between the retaining portion 13 of the first master piston 13 and the retaining portion 14c of the second master piston 14. The second return spring 18 is greater in set load than the first return spring 17. The second return spring 18 urges the second master piston 14 backward to place the second master piston 14 at an initial position, as illustrated in FIG. 2, unless the brake pedal 71 is depressed by the vehicle driver.

When the second master piston 14 is in the initial position, the fourth port 11e coincides or communicates with the fluid holes 14d, so that the reservoir 19 communicates with the second master chamber 10b. This causes the brake fluid to be delivered from the reservoir 19 to the second master chamber 10b. An excess of the brake fluid in the second master chamber 10b is returned back to the reservoir 19. When the second master piston 14 travels frontward from the initial position, it will cause the fourth port 11e to be blocked by the cylindrical portion 14a, so that the second master chamber 10b is closed hermetically to create the master pressure therein.

The fail-safe cylinder 12 is disposed behind the second master piston 14 within the cylindrical cavity 11p of the master cylinder 11 to be slidable in the longitudinal direction of the cylindrical cavity 11p. The fail-safe cylinder 12 is made up of the front cylindrical portion 12a, the first cylindrical portion 12b, and the second cylindrical portion 12c which are aligned with each other in the lengthwise direction thereof. The front cylindrical portion 12a, the first cylindrical portion 12b, and the second cylindrical portion 12c are formed integrally with each other and all of a hollow cylindrical shape. The front cylindrical portion 12a has an outer diameter a. The first cylindrical portion 12b has an outer diameter b which is greater than the outer diameter a of the front cylindrical portion 12a. The second cylindrical portion 12c has an outer diameter c which is greater than the outer diameter b of the first cylindrical portion 12b. The fail-safe cylinder 12 has an outer shoulder formed between the front cylindrical portion 12a and the first cylindrical portion 12b to define a pressing surface 12i.

The second cylindrical portion 12c has a flange 12h extending outward from a rear end thereof. The flange 12h contacts with the stopper 21 to stop the fail-safe cylinder 12 from moving outside the master cylinder 11. The second cylindrical portion 12c has a rear end formed to be greater in inner diameter than another portion thereof to define an inner shoulder 12j.

The front cylindrical portion 12a is disposed inside the second cylindrical portion 14b of the second master piston 14. The first cylindrical portion 12b has first inner ports 12d formed in a rear portion thereof. The first inner ports 12d communicate between the outer peripheral surface and the inner peripheral surface of the first cylindrical portion 12b, in other words, passes through the thickness of the first cylindrical portion 12b. The second cylindrical portion 12c has formed in a front portion thereof a second inner port 12e and a third inner port 12f which extend through the thickness of the second cylindrical portion 12c. The second cylindrical portion 12c also has fourth inner ports 12g formed in a middle portion thereof. The fourth inner ports 12g extend through the thickness of the second cylindrical portion 12c and opens toward the front end (i.e., the head) of the input piston 15 disposed within the fail-safe cylinder 12.

The second cylindrical portion 12c, as illustrated in FIG. 3, has a stopper 12m formed on a front inner peripheral wall thereof. The stopper 12m has formed therein fluid flow paths 12n extending in the longitudinal direction of the second cylindrical portion 12c.

The input piston 15 is, as clearly illustrated in FIG. 2, located behind the spool cylinder 24 and the spool piston 23, which will be described later in detail, to be slidable in the longitudinal direction thereof within a rear portion of the second cylindrical portion 12c of the fail-safe cylinder 12 (i.e., the cylindrical cavity 11p). The input piston 15 is made of a cylindrical member and substantially circular in cross section thereof. The input piston 15 has a rod-retaining chamber 15a formed in a rear end thereof. The rod-retaining chamber 15a has a conical bottom. The input piston 15 also has a spring-retaining chamber 15b formed in a front end thereof. The input piston 15 has an outer shoulder 15e to have a small-diameter rear portion which is smaller in outer diameter than a major portion thereof.

The input piston 15 has seal retaining grooves (i.e., recesses) 15c and 15d formed in an outer periphery thereof. Sealing members 55 and 56 are disposed in the seal retaining grooves 15c and 15d in hermetical contact with an entire inner circumference of the second cylindrical portion 12c of the fail-safe cylinder 12.

The input piston 15 is coupled with the brake pedal 71 through the operating rod 16 and a connecting member 31, so that the effort acting on the brake pedal 71 is transmitted to the input piston 15. The input piston 15 works to transmit the effort, as exerted thereon, to the spool piston 23 through the simulator spring 26, the movable member 32, the simulator rubber 34, the retaining piston 33, and the damper 37, so that the spool piston 23 travels in the longitudinal direction thereof.

Figure 7:
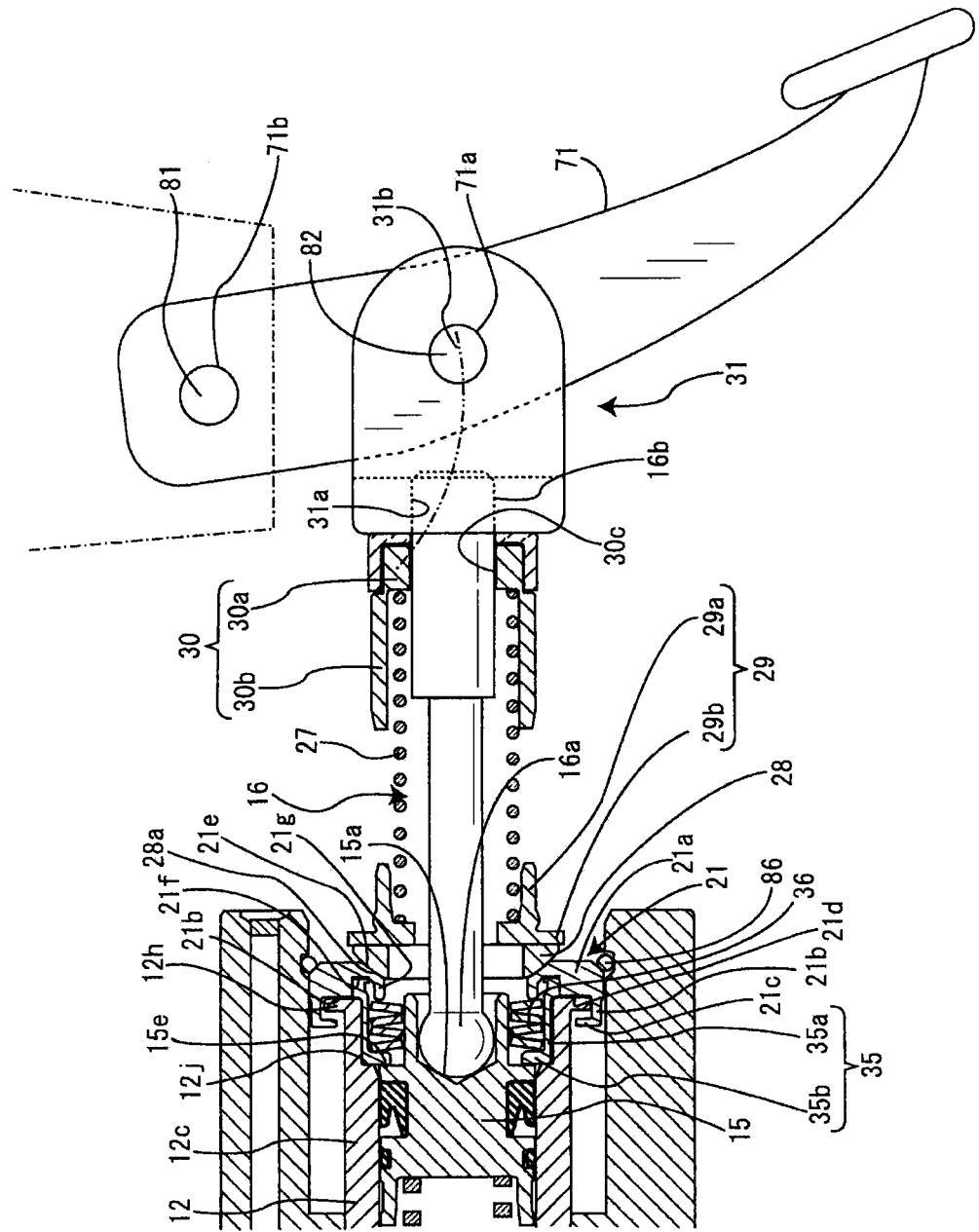
FIG. 7 is a partially enlarged view of a rear portion of a hydraulic booster of the braking apparatus of FIG. 2.

Referring to FIG. 7, the spring retainer 35 is made up of a hollow cylinder 35a and a ring-shaped support 35b extending inwardly from a front edge of the hollow cylinder 35a. The spring retainer 35 is fit in the rear end of the second cylindrical portion 12c with the support 35b having the front surface thereof placed in contact with the shoulder 15e of the input piston 15.

The stopper 21 is attached to the inner wall of the rear end of the master cylinder 11 to be movable. The stopper 21 is designed as a stopper plate and made up of a ring-shaped base 21a, a hollow cylinder 21b, and a stopper ring 21c. The hollow cylinder 21b extends forward from the front end of the base 21a. The stopper ring 21c extends inwardly from the front end of the hollow cylinder 21b.

The base 21a has a front surface 21d which lies inside the hollow cylinder 21b as a support surface with which the rear end (i.e., the flange 12h) of the fail-safe cylinder 12 is placed in contact. The flange 12h will also be referred to as a contact portion below. The stopper 21 also includes a ring-shaped retaining recess 21f formed in the front surface of the base 21a inside the support surface 21d in the shape of a groove. Within the retaining recess 21f, the rear end of the cylinder 35a of the spring retainer 35 is fit. The stopper 21 further includes a ring-shaped protrusion 21g extending from the front of the base 21a inside the retaining recess 21f.

The base 21a has a domed recess 21e formed on a central area of the rear end thereof. The recess 21e serves as a seat and is of an arc or circular shape in cross section. The recess 21e will also be referred to as a seat below. The master cylinder 11 has a C-ring 86 fit in a groove formed in the inner wall of the open rear end thereof. The C-ring 86 works as a stopper to hold the stopper 21 from being removed from the master cylinder 11.

The movable member 28 is used as a spacer and made of a ring-shaped member. The movable member 28 has a front surface which is oriented toward the front of the master cylinder 11 and defines a convex or dome-shaped pressing surface 28a. The pressure surface 28a is of an arc or circular shape in cross section. The pressing surface 28a is contoured to conform with the shape of the seat 21e. The movable member 28 is disposed on the front end of the first spring retainer 29 which faces the front of the master cylinder 11. The movable member 28 is also arranged behind the stopper 21 with the pressing surface 28a being placed in slidable contact with the seat 21e. The movable member 28 is movable or slidable on the stopper 21 (i.e., the seat 21e).

The fail-safe spring 36 is disposed between the support 35b of the spring retainer 35 and the protrusion 21g of the stopper 21 within the cylinder 35a of the spring retainer 35. The fail-safe spring 36 is made up of a plurality of diaphragm springs and works to urge the fail-safe cylinder 12 forward against the master cylinder 11.

The first spring retainer 29 is made up of a hollow cylinder 29a and a flange 29b extending from the front end of the hollow cylinder 29a inwardly and outwardly. The first spring 29 is arranged behind the movable member 28 with the flange 29b placed in abutment contact with the rear end of the movable member 28.

The operating rod 16 has a pressing ball 16a formed on the front end thereof and a screw 16b formed on the rear end thereof. The operating rod 16 is joined to the rear end of the input piston 15 with the pressing ball 16a fit in the rod-retaining chamber 15a. The operating rod 16 has a given length extending in the longitudinal direction of the hydraulic booster 10. Specifically, the operating rod 16 has the length aligned with the length of the hydraulic booster 10. The operating rod 16 passes through the movable member 28 and the first spring retainer 29.

The second spring retainer 30 is disposed behind the first spring retainer 29 in alignment therewith and secured to the rear portion of the operating rod 16. The second spring retainer 30 is of a hollow cylindrical shape and made up of an annular bottom 30a and a cylinder 30b extending from the bottom 30a frontward. The bottom 30a has a threaded hole 30c into which the screw 16b of the operating rod 16 is fastened.

The pedal return spring 27 is disposed between the flange 29b of the first spring retainer 29 and the bottom 30a of the second spring retainer 30. The pedal return spring 27 is held inside the cylinder 29a of the first spring retainer 29 and the cylinder 30b of the second spring retainer 30.

The connecting member 31 has a threaded hole 31a formed in the front end thereof. The screw 16b of the operating rod 16 is fastened into the threaded hole 31a to join the connecting member 31 to the rear end of the operating rod 16. The bottom 30a of the second spring retainer 30 is in contact with the front end of the connecting member 31. The connecting member 31 has an axial through hole 31b formed in substantially the center thereof in the longitudinal direction of the hydraulic booster 10. The threaded hole 30c of the second spring retainer 30 and the threaded hole 31a of the connecting member 31 are in engagement with the screw 16b of the operating rod 16, thereby enabling the connecting member 31 to be regulated in position thereof relative to the operating rod 16 in the longitudinal direction of the operating rod 16.

The brake pedal 71 works as a brake actuating member and is made of a lever on which an effort is exerted by the driver of the vehicle. The brake pedal 71 has an axial hole 71a formed in the center thereof and a mount hole 71b formed in an upper portion thereof. A bolt 81 is inserted into the mount hole 71b to secure the brake pedal 71 to a mount base of the vehicle, as indicated by a broken line in FIG. 2. The brake pedal 71 is swingable about the bolt 81. A connecting pin 82 is inserted into the axial hole 71a of the brake pedal 71 and the axial hole 31b of the connecting member 31, so that the swinging motion of the brake pedal 71 is converted into linear motion of the connecting member 31.

Figure 2:
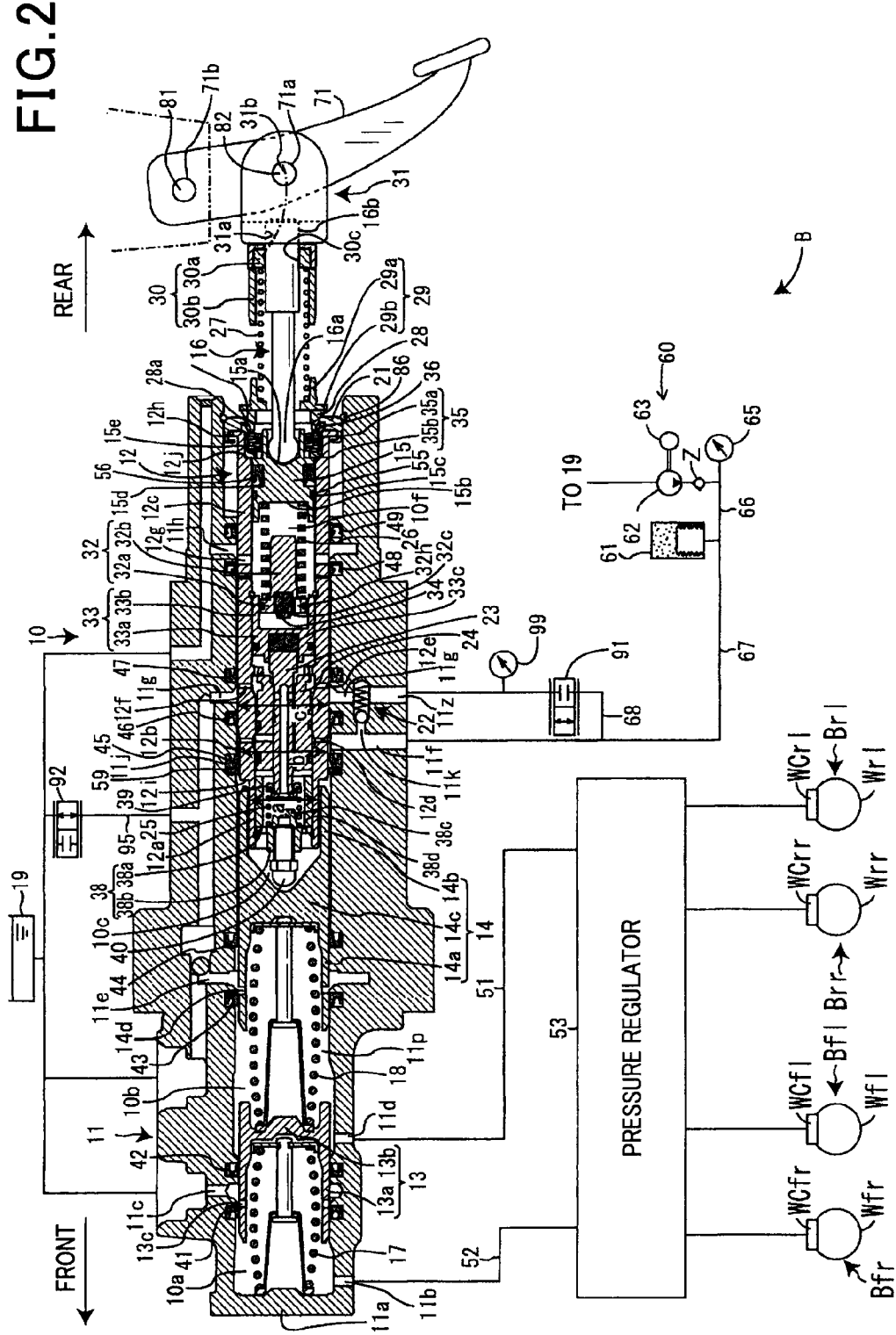
FIG. 2 is a partially longitudinal sectional view which illustrates the braking apparatus of FIG. 1.

The pedal return spring 27 urges the second spring retainer 30 and the connecting member 31 backward to keep the brake pedal at the initial position, as illustrated in FIG. 2. The depression of the brake pedal 71 will cause the brake pedal 71 to swing about the mount hole 71b (i.e., the bolt 81) and also cause the axial holes 71a and 31b to swing about the mount hole 71b. A two-dot chain line in FIG. 2 indicates a path of travel of the axial holes 71a and 31b. Specifically, when the brake pedal 71 is depressed, the axial holes 71a and 31b move upward along the two-dot chain line. This movement causes the movable member 28 and the first spring retainer 29 to swing or slide on the stopper 21 to prevent an excessive pressure (i.e., shearing force) from acting on the pedal return spring 27.

The retaining piston 33 is, as clearly illustrated in FIG. 2, disposed inside the front portion of the second cylindrical portion 12c of the fail-safe cylinder 12 (i.e., within the cylindrical cavity 11p of the master cylinder 11) to be slidable in the longitudinal direction thereof. The retaining piston 33 is made of a bottomed cylindrical member and includes a front end defining a bottom 33a and a cylinder 33b extending rearward from the bottom 33a The bottom 33a has formed in the front end thereof a concave recess 33c serving as a retaining cavity. The cylinder 33b has a seal-retaining groove 33d formed in the outer circumference thereof. A seal 75 is fit in the seal-retaining groove 33d in contact with an entire inner circumference of the second cylindrical portion 12c of the fail-safe cylinder 12. A C-ring 85 is, as clearly illustrated in FIG. 2, fit in an angular groove formed in the outer periphery of the second cylindrical portion 12c. The C-ring 85 is contactable with the rear end of the retaining position 33, that is, works as a stopper to hold the retaining piston 33 from sliding backward.

The movable member 32 is, as illustrated in FIG. 2, disposed inside the rear portion of the second cylindrical portion 12c of the fail-safe cylinder 12 (i.e., within the cylindrical cavity 11p of the master cylinder 11) to be slidable in the longitudinal direction thereof. The movable member 32 is made up of a flange 32a formed on the front end thereof and a shaft 32b extending backward from the flange 32a in the longitudinal direction of the hydraulic booster 10.

The flange 32a has a rubber-retaining chamber 32c formed in the front end thereof in the shape of a concave recess. In the rubber-retaining chamber 32c, the cylindrical simulator rubber 34 is fit which protrudes outside the front end of the rubber-retaining chamber 32c. When placed at an initial position, as illustrated in FIG. 2, the simulator rubber (i.e., the movable member 32) is located away from the retaining piston 33.

The flange 32a has formed therein a fluid path 32h which communicates between a fluid chamber formed in front of the movable member 32, in other words, between the front end of the flange 32a and the inner wall of the retaining piston 33, and a simulator chamber 10f, which will be described later in detail. When the movable member 32 moves relative to the retaining piston 33, it will cause the brake fluid to flow from the above fluid chamber to the simulator chamber 10f or vice versa, thereby facilitating the sliding movement of the movable member 32 towards or away from the retaining piston 33.

The simulator chamber 10f (which will also be referred to as a stroke chamber below) is defined by the inner wall of the second cylindrical portion 12c of the fail-safe cylinder 12, the rear end of the retaining piston 33, and the front end of the input piston 15. The simulator chamber 10f is filled with the brake fluid and works as a brake simulator chamber to develop a reactive pressure in response to the braking effort on the brake pedal 71.

The simulator spring 26 is a braking simulator member engineered as a braking operation simulator and disposed between the flange 32a of the movable member 32 and the spring-retaining chamber 15b of the input piston 15 within the simulator chamber 10f. In other words, the simulator spring 26 is located ahead of the input piston 15 within the second cylindrical portion 12c of the fail-safe cylinder 12 (i.e., the cylindrical cavity 11p of the master cylinder 11). The shaft 32b of the movable member 32 is inserted into the simulator spring 26 to retain the simulator spring 26. The simulator spring 26 has a front portion press-fit on the shaft 32b of the movable member 32. With these arrangements, when the input piston 15 advances further from where the simulator rubber 34 (i.e., the movable member 32) hits the retaining piston 33, it will cause the simulator spring 26 to urge the input piston 15 backward.

The first inner ports 12d open at the outer periphery of the first cylindrical portion 12b of the fail-safe cylinder 12. The second cylindrical portion 12c is, as described above, shaped to have the outer diameter c greater than the outer diameter b of the first cylindrical portion 12b. Accordingly, the exertion of the accumulator pressure on the fifth port 11f (i.e., when the brake fluid is being supplied from the accumulator 61 to the fifth port 11f) will cause force or hydraulic pressure, as created by the accumulator pressure (i.e., the pressure of the brake fluid delivered from the accumulator 61) and a difference in traverse cross-section between the first cylindrical portion 12b and the second cylindrical portion 12c, to press the fail-safe cylinder 12 rearward against the stopper 21, thereby placing the fail-safe cylinder 12 at a rearmost position (i.e., the initial position) of the above describe preselected allowable range.

When the fail-safe cylinder 12 is in the initial position, the fourth inner ports 12g communicate with the seventh port 11h of the master cylinder 11. Specifically, the hydraulic communication between the simulator chamber 10f and the reservoir 19 is established by a reservoir flow path, as defined by the fourth inner ports 12g and the seventh port 11h. The simulator chamber 10f is a portion of the cylindrical cavity 11p, as defined ahead the input piston 15 inside the fail-safe cylinder 12. A change in volume of the simulator chamber 10f arising from the longitudinal sliding movement of the input piston 15 causes the brake fluid within the simulator chamber 10f to be returned back to the reservoir 19 or the brake fluid to be supplied from the reservoir 19 to the simulator chamber 10f, thereby allowing the input piston 15 to move frontward or backward in the longitudinal direction thereof without undergoing any hydraulic resistance.

The spool cylinder 24 is, as illustrated in FIG. 3, fixed in the first cylindrical portion 12b of the fail-safe cylinder 12 (i.e., the cylindrical cavity 11p of the master cylinder 11) behind the second master piston 14. The spool cylinder 24 is of a substantially hollow cylindrical shape. The spool cylinder 24 has seal-retaining grooves 24a and 24b formed in an outer periphery thereof in the shape of a concave recess. Sealing members 57 and 58 are fit in the seal-retaining grooves 24a and 24b in direct contact with an entire circumference of the inner wall of the first cylindrical portion 12b to create a hermetical seal therebetween. The sealing members 57 and 58 develop mechanical friction between themselves and the inner wall of the first cylindrical portion 12b to hold the spool cylinder 24 from advancing in the first cylindrical portion 12b. The spool cylinder 24 has the rear end placed in contact with the stopper 12m, so that it is held from moving backward.

The spool cylinder 24 has formed therein a spool port 24c which communicates between inside and outside thereof. The spool port 24c communicates with the first inner ports 12d. The spool cylinder 24 has a first spool groove 24d formed in a portion of an inner wall thereof which is located behind the spool port 24c. The first spool groove 24d extends along an entire inner circumference of the spool cylinder 24 in the shape of a concave recess. The spool cylinder 24 also has a second spool groove 24f formed in a rear end of the inner wall thereof which is located behind the first spool groove 24d. The second spool groove 24f extends along the entire inner circumference of the spool cylinder 24 in the shape of a concave recess.

The spool cylinder 24 also has a fluid flow groove 24e formed in a portion of an outer wall thereof which is located behind the seal-retaining groove 24b. The fluid flow groove 24e extends along an entire outer circumference of the spool cylinder 24 in the shape of a concave recess. The third inner port 12f opens into the fluid flow groove 24e. Specifically, the fluid flow groove 24e defines a flow path leading to the reservoir 19 through the third inner port 12f and the sixth port 11g.

The spool piston 23 is made of a cylindrical shaft which is of a circular cross section. The spool piston 23 is disposed inside the spool cylinder 24 to be slidable in the longitudinal direction thereof.

The spool piston 23 has a cylindrical rear end defining an in-cylinder portion 23a which is slidable in the longitudinal direction thereof into and out of the retaining cavity 33c of the retaining piston 33. The outer periphery of the in-cylinder portion 23a of the spool piston 23 is separate from the inner periphery of the retaining cavity 33c of the retaining piston 33 through an air gap to define a pilot-pressure induction path 23x.

The damper 37 is installed between the bottom of the retaining cavity 33c and the rear end of the spool piston 23. The damper 37 is made of a cylindrical elastic rubber, but may alternatively be implemented by an elastically deformable member such as a coil spring or a diaphragm.

The spool piston 23 has a third spool groove 23b formed in an axial central portion of an outer wall thereof. The third spool groove 23b extends along an entire outer circumference of the spool piston 23 in the shape of a concave recess. The spool piston 23 also has a fourth spool groove 23c formed in a portion of the outer wall thereof which is located behind the third spool groove 23b. The fourth spool groove 23c extends along the entire outer circumference of the spool piston 23 in the shape of a concave recess. The spool piston 23 also has an elongated fluid flow hole 23e which extends along the longitudinal center line thereof from the front end behind the middle of the length of the spool piston 23. The spool piston 23 also has formed therein a first fluid flow port 23d and a second fluid flow port 23f which communicate between the fourth spool groove 23c and the fluid flow hole 23e.

Referring back to FIG. 2, the hydraulic booster 10 also includes a servo chamber 10c which is defined by the rear inner wall of the second master piston 14, the front end portion of the spool piston 23, and the front end of the spool cylinder 24 behind the retaining portion 14c of the second master piston 14 within the cylindrical cavity 11p of the master cylinder 11.

The first spool spring retainer 38 is, as clearly illustrated in FIG. 2, made up of a retaining disc 38a and a cylindrical fastener 38b. The retaining disc 38a is fit in an inner front end wall of the front cylindrical portion 12a of the fail-safe cylinder 12 and closes a front opening of the front cylindrical portion 12a. The cylindrical fastener 38b extends frontward from the front center of the retaining disc 38a. The cylindrical fastener 38b has an internal thread formed in an inner periphery thereof. The retaining disc 38a has a contact portion 38c formed on a central area of the rear end thereof. The retaining disc 38a also has fluid flow holes 38d passing through the thickness thereof.

The pushing member 40 is made of a rod and has a rear end engaging the internal thread of the cylindrical fastener 38b.

The second spool spring retainer 39 is, as illustrated in FIG. 3, made up of a hollow cylindrical body 39a and a ring-shaped retaining flange 39b The cylindrical body 39a has a front end defining a bottom 39c. The retaining flange 39b extends radially from the rear end of the cylindrical body 39a. The front end of the spool piston 23 is fit in the cylindrical body 39a in engagement with an inner periphery of the cylindrical body 39a, so that the second spool spring retainer 39 is secured to the front end of the spool piston 23. The bottom 39c has a through hole 39d formed therein. The second spool spring retainer 39 is, as can be seen from FIG. 2, aligned with the first spool spring retainer 38 at a given interval away from the contact portion 38c.

The spool spring 25 is, as illustrated in FIGS. 2 and 3, disposed between the retaining disc 38a of the first spool spring retainer 38 and the retaining flange 39b of the second spool spring retainer 39. The spool spring 25 works to urge the spool piston 23 backward relative to the fail-safe cylinder 12 (i.e., the master cylinder 11) and the spool cylinder 24.

The spring constant of the simulator spring 26 is set greater than that of the spool spring 25. The spring constant of the simulator spring 26 is also set greater than that of the pedal return spring 27.

Simulator

The simulator made up of the simulator spring 26, the pedal return spring 27, and the simulator rubber 34 will be described below. The simulator is a mechanism engineered to apply a reaction force to the brake pedal 71 to imitate an operation of a typical brake system, that is, make the driver of the vehicle experience the sense of depression of the brake pedal 71.

When the brake pedal 71 is depressed, the pedal return spring 27 contracts, thereby creating a reaction pressure (which will also be referred to as a reactive force) acting on the brake pedal 71. The reaction pressure is given by the sum of a set load of the pedal return spring 27 and a product of the spring constant of the pedal return spring 27 and the stroke of the brake pedal 71 (i.e., the connecting member 31).

When the brake pedal 71 is further depressed, and the simulator rubber 34 hits the retaining piston 33, the pedal return spring 27 and the simulator spring 26 contract. The reaction pressure acting on the brake pedal is given by a combination of physical loads generated by the simulator spring 26 and the pedal return spring 27. Specifically, a rate of increase in reaction pressure exerted on the brake pedal 71 during the stroke of the brake pedal 71 (i.e., unit of depression of the brake pedal 71) after the simulator rubber 34 contacts the retaining piston 33 will be greater than that before the simulator rubber 34 contacts the retaining piston 33.

When the simulator rubber 34 contacts the retaining piston 33, and the brake pedal 71 is further depressed, it usually causes the simulator rubber 34 to contract. The simulator rubber 34 has a spring constant which increases, in the nature thereof, as the simulator rubber 34 contracts. Therefore, there is a transient time for which the reaction pressure exerted on the brake pedal 71 changes gently to minimize the driver's discomfort arising from a sudden change in reaction pressure exerted on the foot of the driver of the vehicle.

Specifically, the simulator rubber 34 serves as a cushion to decrease the rate of change in reaction pressure acting on the brake pedal 71 during the depression thereof. The simulator rubber 34 of this embodiment is, as described above, secured to the movable member 32, but may be merely placed between opposed end surfaces of the movable member 32 and the retaining piston 33. The simulator rubber 34 may alternatively be attached to the rear end of the retaining piston 33.

As described above, the reaction pressure exerted on the brake pedal 71 during the depression thereof increases at a smaller rate until the simulator rubber 34 contacts the retaining piston and then increases at a greater rate, thereby giving a typical sense of operation (i.e., depression) of the brake pedal 71 to the driver of the vehicle.

Pressure Regulator

The pressure regulator 53 works to increase or decrease the master pressure that is the pressure of brake fluid delivered from the master chambers 10a and 10b to produce wheel cylinder pressure to be fed to the wheel cylinders WCfl, WCfr, WCrl, and WCrr and is engineered to achieve known anti-lock braking control or known electronic stability control to avoid lateral skid of the vehicle. The pressure regulator 53 may be designed to have a known structure such as taught in Japanese Patent First Publication No. 2013-6534 or No. 2008-87069, and explanation thereof in detail will be omitted here. The wheel cylinders WCfr and WCfl are connected to the first port 11b of the first master cylinder 10a through the pipe 52 and the pressure regulator 53. Similarly, the wheel cylinders WCrr and WCrl are connected to the third port 11d of the second master cylinder 10b through the pipe 51 and the pressure regulator 53.

Operation of Hydraulic Booster

The operation of the hydraulic booster 10 will be described below in detail. The hydraulic booster 10 is equipped with a spool valve made up of the spool cylinder 24 and the spool piston 23. Upon depression of the brake pedal 71, the spool valve is driven or slides in the longitudinal direction of the master cylinder 11 in response to the driver's effort on the brake pedal 71. The hydraulic booster 10 then enters any one of the pressure-reducing mode, the pressure-increasing mode, and the pressure-holding mode.

Pressure-Reducing Mode

The pressure-reducing mode is entered when the brake pedal 71 is not depressed or the driver's effort (which will also be referred to as braking effort below) on the brake pedal 71 is lower than or equal to a frictional braking force generating level P2, as indicated in a graph of FIG. 4. When the brake pedal is, as illustrated in FIG. 2, released, so that the pressure-reducing mode is entered, the simulator rubber 34 (i.e., the movable member 32) is separate from the bottom 33a of the retaining piston 33.

When the simulator rubber 34 is located away from the bottom 33a of the retaining piston 33, the spool piston 23 is placed by the spool spring 25 at the rearmost position in the movable range thereof (which will also be referred to as a pressure-reducing position below). The spool port 24c is, as illustrated in FIG. 3, blocked by the outer periphery of the spool piston 23, so that the accumulator pressure that is the pressure in the accumulator 61 is not exerted on the servo chamber 10c.

The fourth spool groove 23c of the spool piston 23, as illustrated in FIG. 3, communicates with the second spool groove 24f of the spool cylinder 24. The servo chamber 10c, therefore, communicates with the reservoir 19 through a pressure-reducing flow path, as defined by the fluid flow hole 23e, the first fluid flow part 23d, the fourth spool groove 23c, the second spool groove 24f, the fluid flow path 12n, the fluid flow groove 24e, the third inner port 12f, and the sixth port 11g. This causes the pressure in the servo chamber 10c to be equal to the atmospheric pressure, so that the master pressure is not developed in the first master chamber 10a and the second master chamber 10b.

When the brake pedal 71 is depressed, and the simulator rubber 34 touches the bottom 33a of the retaining piston 33 to develop the pressure (which will also be referred to as an input pressure below) urging the spool piston 23 forward through the retaining piston 33, but such pressure is lower in level than the pressure, as produced by the spool spring 25 and exerted on the spool piston 23, the spool piston 23 is kept from moving forward in the pressure-reducing position. Note that the above described input pressure exerted on the spool piston 23 through the retaining piston 33 is given by subtracting a load required to compress the pedal return spring 27 from a load applied to the connecting member 31 upon depression of the brake pedal 71. When the load or effort applied to the brake pedal 71 is lower than or equal to the frictional braking force generating level P2, the hydraulic booster 10 is kept from entering the pressure-increasing mode, so that the servo pressure and the master pressure are not developed, thus resulting in no frictional braking force generated in the friction braking devices Bfl, Bfr, Brl, and Brr.

Pressure-Increasing Mode

Figure 5:
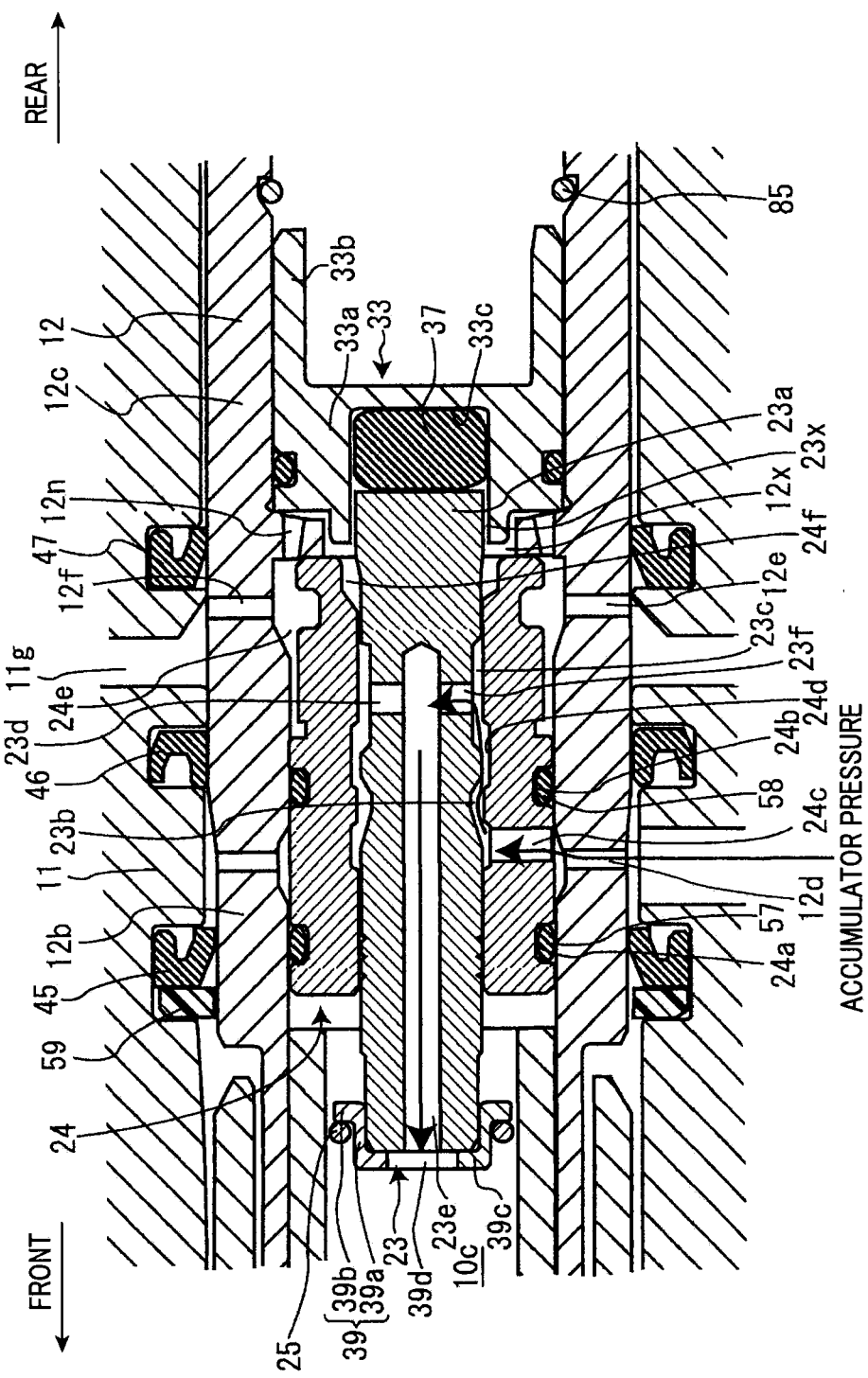
FIG. 5 is an enlarged view of a spool piston and a spool cylinder of a hydraulic booster of the braking apparatus of FIG. 2 in a pressure-increasing mode.

When the effort on the brake pedal 71 exceeds the frictional braking force generating level P2, the hydraulic booster 10 enters the pressure-increasing mode. Specifically, the application of effort to the brake pedal 71 causes the simulator rubber 34 (i.e., the movable member 32) to push the retaining piston 33 to urge the spool piston 23 forward. The spool piston 23 then advances to a front position, as illustrated in FIG. 5 within the movable range against the pressure, as produced by the spool spring 25. Such a front position will also be referred to as a pressure-increasing position below.

When the spool piston 23 is in the pressure-increasing position, as illustrated in FIG. 5, the first fluid flow port 23d is closed by the inner periphery of the spool cylinder 24 to block the communication between the first fluid flow part 23d and the second spool groove 24f. This blocks the fluid communication between the servo chamber 10c and the reservoir 19.

Further, the spool port 24c communicates with the third spool groove 23b. The third spool groove 23b, the first spool groove 24d, and the fourth spool groove 23c communicate with each other, so that the pressure in the accumulator 61 (i.e., the accumulator pressure) is delivered to the servo chamber 10c through a pressure-increasing flow path, as defined by the first inner port 12d, the spool port 24c, the third spool groove 23b, the first spool groove 24d, the fourth spool groove 23c, the second fluid flow port 23f, the fluid flow hole 23e, and the connecting hole 39d. This results in a rise in servo pressure.

The rise in servo pressure will cause the second master piston 14 to move forward, thereby moving the first master piston 13 forward through the second return spring 18. This results in generation of the master pressure within the second master chamber 10b and the first master chamber 10a. The master pressure increases with the rise in servo pressure. In this embodiment, the diameter of the front and rear seals (i.e., the sealing members 43 and 44) of the second master piston 14 is identical with that of the front and rear seals (i.e., the sealing members 41 and 42) of the first master piston 13, so that the servo pressure will be equal to the master pressure, as created in the second master chamber 10b and the first master chamber 10a.

The generation of the master pressure in the second master chamber 10b and the first master chamber 10a will cause the brake fluid to be delivered from the second master chamber 10b and the first master chamber 10a to the wheel cylinders WCfr, WCfl, WCrr, and WCrl through the pipes 51 and 52 and the pressure regulator 53, thereby elevating the pressure in the wheel cylinders WCfr, WCfl, WCrr, and WCrl (i.e., the wheel cylinder pressure) to produce the frictional braking force applied to the wheels Wfr, Wfl, Wrr, and Wrl.

Pressure-Holding Mode

When the spool piston 23 is in the pressure-increasing position, the accumulator pressure is applied to the servo chamber 10c, so that the servo pressure rises. This causes a return pressure that is given by the product of the servo pressure and a cross-sectional area of the spool piston 23 (i.e., a seal area) to act on the pool piston 23 backward. When the sum of the return pressure and the pressure, as produced by the spool spring 25 and exerted on the spool piston 23, exceeds the input pressure exerted on the spool piston 23, the spool piston 23 is moved backward and placed in a pressure-holding position, as illustrated in FIG. 6, that is intermediate between the pressure-reducing position and the pressure-increasing position.

Figure 6:
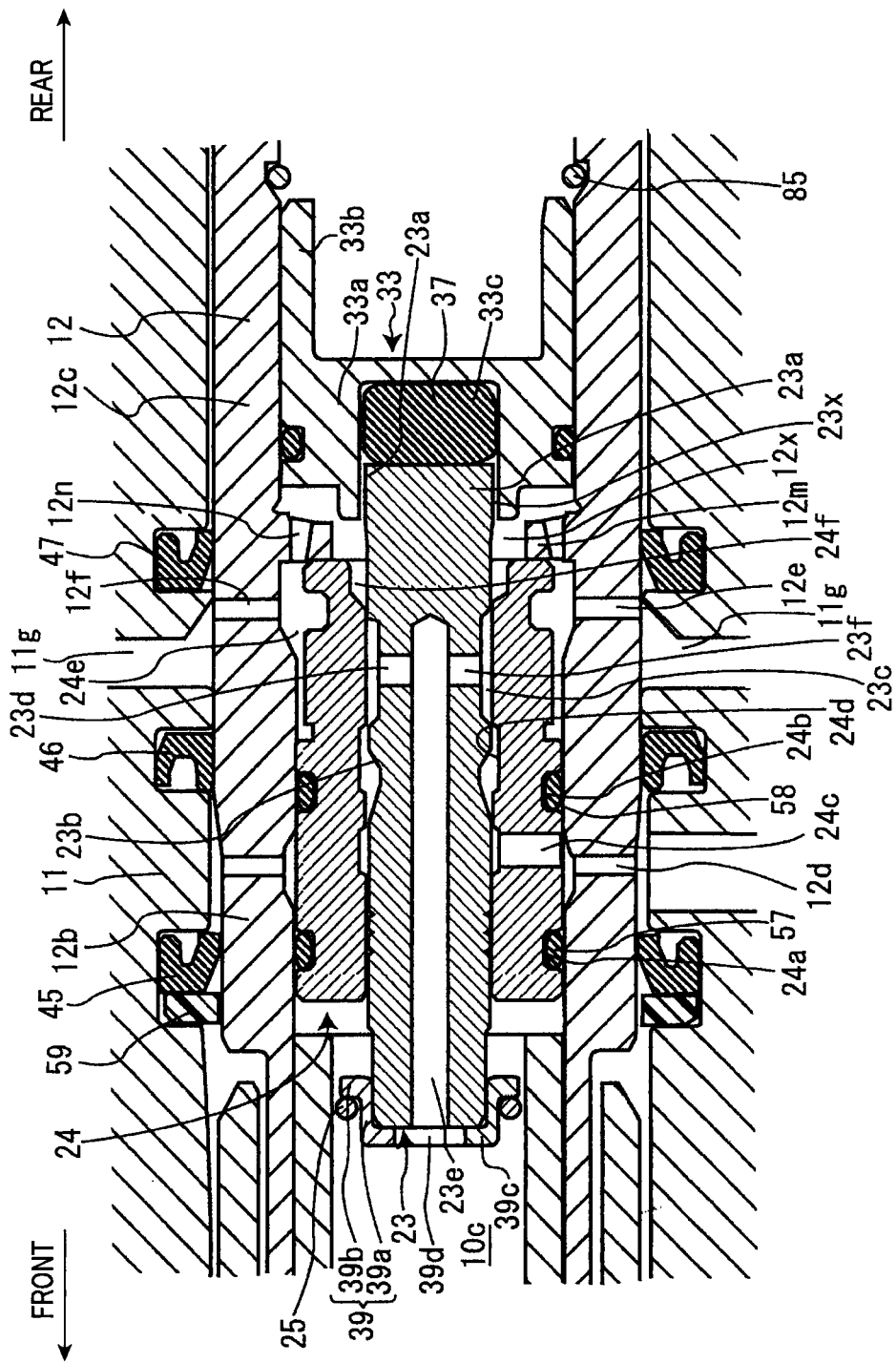
FIG. 6 is an enlarged view of a spool piston and a spool cylinder of a hydraulic booster of the braking apparatus of FIG. 2 in a pressure-holding mode.

When the spool piston 23 is in the pressure-holding position, as illustrated in FIG. 6, the spool port 24c is closed by the outer periphery of the spool piston 23. The fourth spool groove 23c is also closed by the inner periphery of the spool cylinder 24. This blocks the communication between the spool port 24c and the second fluid flow port 23f to block the communication between the servo chamber 10c and the accumulator 61, so that the accumulator pressure is not applied to the servo chamber 10c.

Further, the fourth spool groove 23c is closed by the inner periphery of the spool cylinder 24, thereby blocking the communication between the first fluid flow port 23d and the second spool groove 24f to block the communication between the servo chamber 10c and the reservoir 19, so that the servo chamber 10c is closed completely. This causes the servo pressure, as developed upon a change from the pressure-increasing mode to the pressure-holding mode, to be kept as it is.

When the sum of the return pressure exerted on the spool piston 23 and the pressure, as produced by the spool spring 25 and exerted on the spool piston 23, is balanced with the input pressure exerted on the spool piston 23, the pressure-holding mode is maintained. When the effort on the brake pedal 71 drops, so that the input pressure applied to the spool piston 23 decreases, and the sum of the return pressure applied to the spool piston 23 and the pressure, as produced by the spool spring 25 and exerted on the spool piston 23, exceeds the input pressure exerted on the spool piston 23, it will cause the spool piston 23 to be moved backward and placed in the pressure-reducing position, as illustrated in FIG. 3. The pressure-reducing mode is then entered, so that the servo pressure in the servo chamber 10c drops.

Alternatively, when the spool piston 23 is in the pressure-holding position, and the input pressure applied to the spool piston 23 rises with an increase in braking effort on the brake pedal 71, so that the input pressure acting on the spool piston 23 exceeds the sum of the return pressure exerted on the spool piston 23 and the pressure, as produced by the spool spring 25 and exerted on the spool piston 23, it will cause the spool piston 23 to be moved forward, and placed in the pressure-increasing position, as illustrated in FIG. 5. The pressure-increasing mode is then entered, so that the servo pressure in the servo chamber 10c rises.

Usually, the friction between the outer periphery of the spool piston 23 and the inner periphery of the spool cylinder 24 results in hysteresis in the movement of the spool piston 23, which disturbs the movement of the spool piston 23 in the longitudinal direction thereof, thus leading to less frequent switching from the pressure-holding mode to either of the pressure-reducing mode or the pressure-increasing mode.

Relation Between Regenerative Braking Force and Frictional Braking Force

The relation between the regenerative braking force and the frictional braking force will be described below with reference to FIG. 4. When the braking effort applied to the brake pedal 71 is lower than the frictional braking force generating level P2, the hydraulic booster 10 is kept in the pressure-reducing mode without switching to the pressure-increasing mode, so that the frictional braking force is not developed. The brake system B, as illustrated in FIG. 4, has a regenerative braking force generating level P1 indicative of the braking effort applied to the brake pedal 71 which is set lower than the frictional braking force generating level P2.

The brake system B is equipped with the brake sensor 72. The brake sensor 72 works to measure an amount of stroke of the brake pedal 71. The driver's effort (i.e. the braking effort) applied to the brake pedal 71 has a given correlation with the amount of stroke of the brake pedal 71. The brake ECU 6, thus, determines whether the braking effort has exceeded the regenerative braking force generating level P1 or not using the output from the brake sensor 72.

Figure 4:
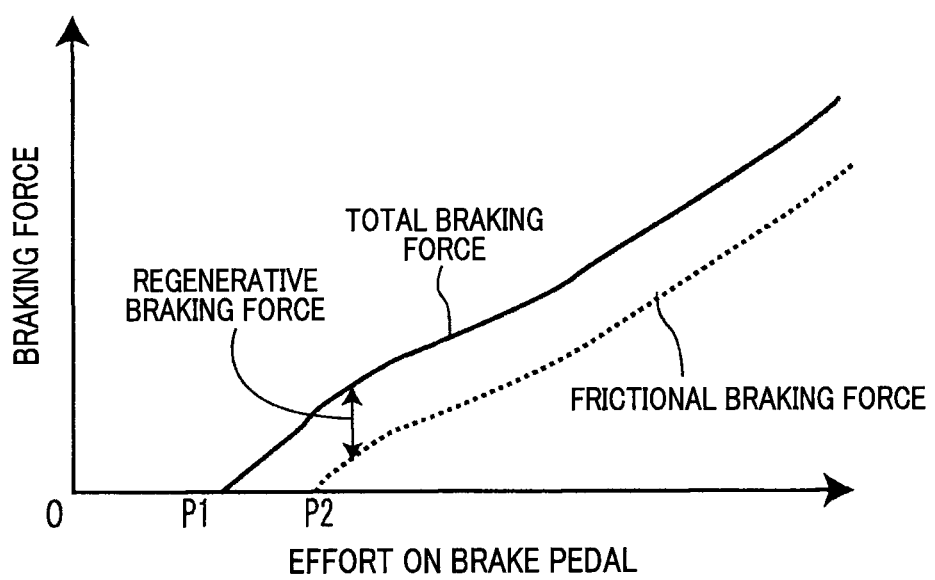
FIG. 4 is a graph which represents a relation between a braking effort acting on a brake pedal and a braking force.

When the brake pedal 71 has been depressed, and the brake ECU 6 determines that the braking effort on the brake pedal 71 has exceeded the regenerative braking force generating level P1, as indicated in FIG. 4, the brake ECU 6, as described above, calculates the target regenerative braking force as a function of the output from the brake sensor 72 and outputs a signal indicative thereof to the hybrid ECU 9.

The hybrid ECU 9 uses the speed V of the vehicle, the state of charge in the battery 507, and the target regenerative braking force to compute the actually producible regenerative braking force that is a regenerative braking force the regenerative braking system A is capable of producing actually. The hybrid ECU 9 then controls the operation of the regenerative braking system A to create the actually producible regenerative braking force.

When determining that the actually producible regenerative braking force does not reach the target regenerative braking force, the hybrid ECU 9 subtracts the actually producible regenerative force from the target regenerative braking force to derive an additional frictional braking force. The event that the actually producible regenerative braking force does not reach the target regenerative braking force is usually encountered when the speed V of the vehicle is lower than a given value or the battery 507 is charged fully or near fully. The hybrid ECU 9 outputs a signal indicative of the additional frictional braking force to the brake ECU 6.

Upon reception of the signal from the hybrid ECU 9, the brake ECU 6 controls the operation of the pressure regulator 53 to control the wheel cylinder pressure to make the friction braking devices Bfl, Bfr, Brl, and Brr create the additional regenerative braking force additionally. Specifically, when it is determined that the actually producible regenerative braking force is less than the target regenerative braking force, the brake ECU 6 actuates the pressure regulator 53 to develop the additional regenerative braking force in the friction braking devices Bfl, Bfr, Brl, and Brr to compensate for a difference (i.e., shortfall) between the target regenerative braking force and the actually producible regenerative braking force, thereby achieving the target regenerative braking force.

As described above, when the hybrid ECU 9 has decided that it is impossible for the regenerative braking system A to produce a required regenerative braking force (i.e., the target regenerative braking force), the pressure regulator 53 regulates the pressure to be developed in the wheel cylinders WCfl, WCfr, WCrl, and WCrr to produce a degree of frictional braking force through the friction braking devices Bfl, Bfr, Brl, and Brr which is equivalent to a shortfall in the regenerative braking force.

Operation of Hydraulic Booster in Event of Malfunction of Hydraulic Pressure Generator When the hydraulic pressure generator 60 has failed in operation, so that the accumulator pressure has disappeared, the fail-safe spring 36 urges or moves the fail-safe cylinder 12 forward until the flange 12h of the fail-safe cylinder 12 hits the stopper ring 21c of the stopper 21. The second cylindrical portion 12c of the fail-safe cylinder 12 then blocks the seventh port 11h of the master cylinder 11 to close the simulator chamber 10f liquid-tightly.

When the simulator chamber 10f is hermetically closed, and the brake pedal 71 is depressed, it will cause the braking effort applied to the brake pedal 71 to be transmitted from the input piston 15 to the retaining piston 33 through the connecting member 31 and the operating rod 16, so that the retaining piston 33, the spool piston 23, and the second spool spring retainer 39 advance.

Upon hitting of the retaining piston 33 on the stopper 12m in the fail cylinder 12, the braking effort on the brake pedal 71 is transmitted to the fail-safe cylinder 12 through the stopper 12m, so that the fail-safe cylinder 12 advances. This causes the pushing member 40 to contact the retaining portion 14c of the second master piston 14 or the pressing surface 12i of the fail-safe cylinder 12 to contact the rear end of the second cylindrical portion 14b of the second master piston 14, so that the braking effort on the brake pedal 71 is inputted to the second master piston 14. In this way, the fail-safe cylinder 12 pushes the second master piston 14.

As apparent from the above discussion, in the event of malfunction of the hydraulic pressure generator 60, the braking effort applied to the brake pedal 71 is transmitted to the second master piston 14, thus developing the master pressure in the second master chamber 10b and the first master chamber 10a. This produces the frictional braking force in the friction braking devices Bfl, Bfr, Brl, and Brr to decelerate or stop the vehicle safely.

The depression of the brake pedal 71 in the event of malfunction of the hydraulic pressure generator 60, as described above, results in frontward movement of the fail-safe cylinder 12, thereby causing the first spring retainer 29 for the pedal return spring 27 to move forward. This causes the braking effort on the brake pedal 71 not to act on the pedal return spring 27. The braking effort is, therefore, not attenuated by the compression of the pedal return spring 27, thereby avoiding a drop in the master pressure arising from the attenuation of the braking effort.

In the event of malfunction of the hydraulic pressure generator 60, the fail-safe cylinder 12 advances, so that the second cylindrical portion 12c which has the outer diameter c greater than the outer diameter b of the first cylindrical portion 12b passes through the sealing member 45. The master cylinder 11 is designed to have the inner diameter greater than the outer diameter c of the second cylindrical portion 12c for allowing the second cylindrical portion 12c to move forward. Consequently, when the hydraulic pressure generator 60 is operating properly, the outer periphery of the first cylindrical portion 12b is, as can be seen in FIG. 2, separated from the inner periphery of the master cylinder 11 through an air gap.

The entire circumferential area of the front end of the sealing member 45 is, as clearly illustrated in FIG. 3, in direct contact with the support member 59. The inner peripheral surface of the support member 59 is in direct contact with the outer peripheral surface of the first cylindrical portion 12b of the fail-safe cylinder 12. In other words, the sealing member 45 is firmly held at the front end thereof by the support member 59 without any air gap therebetween, thus avoiding damage to the sealing member 45 when the fail-safe cylinder 12 moves forward in the event of malfunction of the hydraulic pressure generator 60, so that the first cylindrical portion 12b slides on the sealing member 45.

The support member 59 has, as described above, the slit formed therein. The slit makes the support member 59 expand outwardly upon the forward movement of the fail-safe cylinder 12, thereby allowing the second cylindrical portion 12c to pass through the support member 59. The sealing member 45 is, as described above, held at the front end thereof by the support member 59, thus avoiding damage to the sealing member 45 upon the passing of the second cylindrical portion 12c through the support member 59.

If the accumulator pressure has risen excessively, so that the pressure in the fifth port 11f has exceeded a specified level, the mechanical relief valve 22 will be opened, so that the brake fluid flows from the fifth port 11f to the sixth port 11g and to the reservoir 19. This avoids damage to the pipe 67 and the hydraulic booster 10.

Mechanism for Achieving Collision Avoidance

The mechanism designed to avoid collision of the system vehicle with an object will be discussed below. A space enclosed by, as illustrated in FIG. 3, a portion of the outer periphery of the spool piston 23 closer to the top thereof than the in-cylinder portion 23 is, the front surface of the retaining piston 33, and the inner periphery of the second cylindrical portion 12c of the fail-safe cylinder 12 defines a pilot chamber 12x. The fluid flow path 12n and the second inner port 12e are fluidly connected through a flow path 12y formed between the outer periphery of the spool cylinder 24 and the inner periphery of the fail-safe cylinder 12. The pilot chamber 12x communicates with the sixth port 11g through the fluid flow path 12n, the flow path 12y, and the second inner port 12e.

The master cylinder 11, as illustrated in FIG. 2, has a hydraulic pressure supply port 11z leading to the sixth port 11g. The hydraulic pressure supply port 11z also connects with the pipe 67 through the pipe 68.

The first solenoid valve 91 is disposed in the pipe 68. The pilot chamber 12x connects with the accumulator 61 through the first solenoid valve 91. The first solenoid valve 91 is of a normally-closed type. Specifically, when deenergized, the first solenoid valve 91 keeps the pipe 68 closed. Alternatively, when energized, the first solenoid valve 91 opens the pipe 68. The first solenoid valve 91 is controlled in operation by the brake ECU 6 and works to adjust the accumulator pressure to a pilot pressure.

The second solenoid valve 92 is disposed in a flow path 95 connecting between the pilot chamber 12x and the reservoir 19. The second solenoid valve 92 is of a normally-open type and, when deenergized, keeps the flow path 95 opened.

The first solenoid valve 91 and the second solenoid valve 92 are each implemented by a linear electromagnetic valve which is capable of regulating a flow rate of brake fluid passing therethrough or regulating the hydraulic pressure of brake fluid flowing upstream thereof.

Figure 8A:
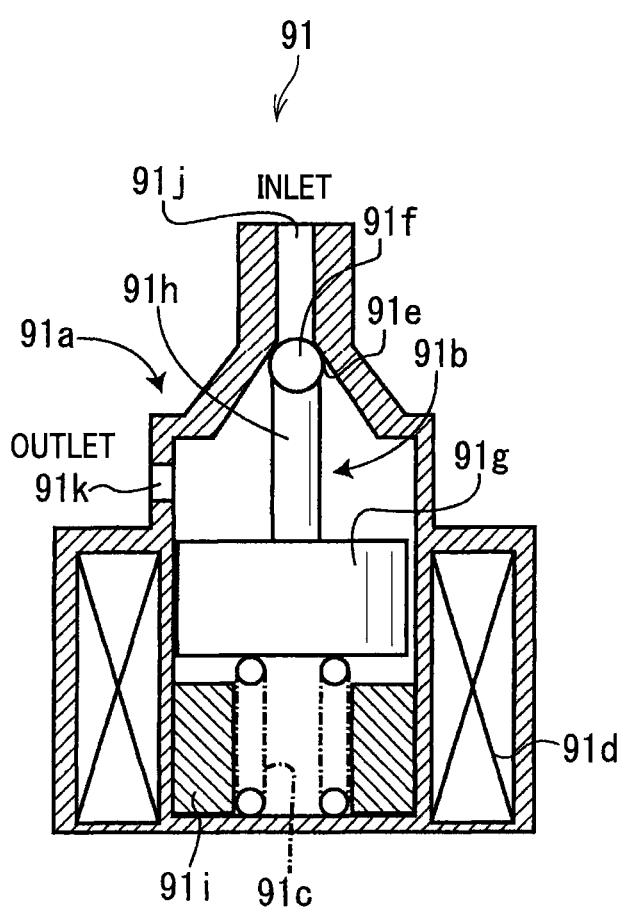
FIG. 8A is a longitudinal sectional view which illustrates an internal structure of a first solenoid valve installed in the braking apparatus of FIG. 2.

The first solenoid valve 91, as illustrated in FIG. 8A, consists essentially of a valve body 91a, a plunger 91b, a coil spring 91c, a coil 91d, and a core 91i. The valve body 91a is made of non-magnetic material and has an inlet 91j and an outlet 91k leading to the inlet 91j through a fluid path formed therein. The inlet 91j is formed in an end of the valve body 91a. The outlet 91k is formed in a side wall of the valve body 91a. The valve body 91a has a tapered or conical valve seat 91e formed on an inner wall thereof. The conical valve seat 91e is located inside the inlet 91j. The plunger 91b consists of a spherical or conical valve body 91f, an armature 91g, and a bar 91h connecting the valve body 91f and the armature 91g. The armature 91g is formed by a magnetic block made of, for example, an electromagnetic stainless steel. The plunger 91b is disposed inside the valve body 91a to be slidable to bring the valve body 91f into hermetic contact with the valve seat 91e.

The coil 19d is installed in the valve body 91a and located outside the periphery of the armature 91g. The core 91i is installed away from the inlet 91j within the valve body 91a and faces the armature 91g. The core 91i is made of magnetic material such as electromagnetic stainless steel. The coil spring 91c is installed in the valve body 91a and works as a biasing mechanism to urge the plunger 91b into constant contact with the valve seat 91e, thereby closing the fluid path in the valve body 91a, that is, blocking the fluid communication between the inlet 91j and the outlet 91k.

When the coil 91d is energized, it will produce a magnetic attraction to pull the armature 91g to the core 91i, so that the pressure pressing the plunger 91b against the valve seat 91e will be decreased, thus causing the fluid path in the valve body 91a to be opened by the pressure of the brake fluid entering the inlet 91j. The brake fluid, therefore, stars to flow from the inlet 91j to the outlet 91k of the first solenoid valve 91. The plunger 91b is moved to a place where a difference in pressure between the inlet 91j and the outlet 91k which acts on the plunger 91b is in balance with the pressure which is produced by the coil 91d and the coil spring 91c and exerted on the plunger 91b (i.e. the sum of the magnetic attraction and the spring pressure). The amount of electric current supplied to the coil 91d is regulated in a duty-factor control mode. Specifically, the pressure which presses the valve body 91f against the valve seat 91e depends upon a duty factor of a pulse signal produced by the brake ECU 6, thereby changing the difference in pressure between the inlet 91j and the outlet 91k.

Figure 8B:
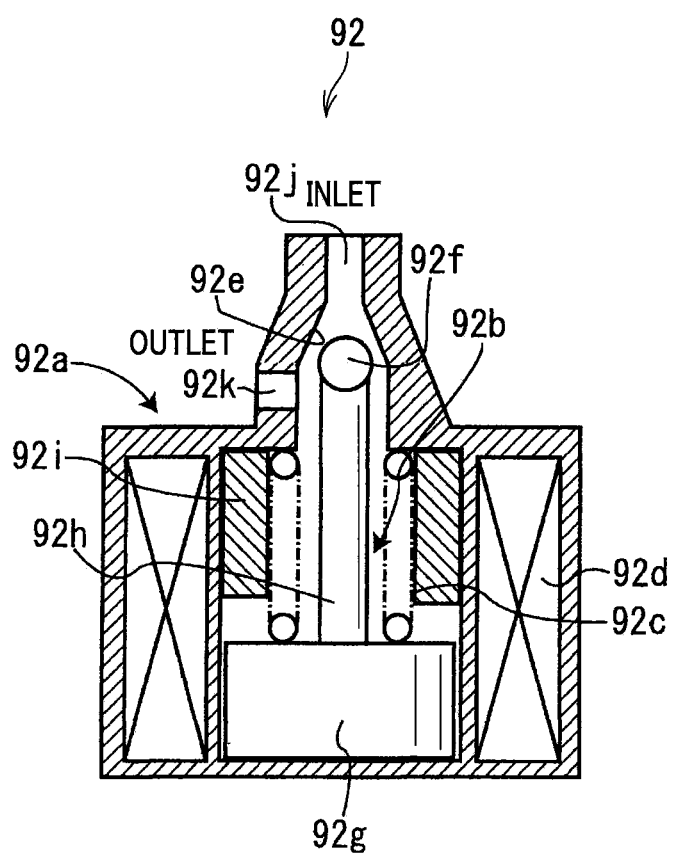
FIG. 8B is a longitudinal sectional view which illustrates an internal structure of a first solenoid valve installed in the braking apparatus of FIG. 2.

The second solenoid valve 92, as illustrated in FIG. 8B, consists essentially of a valve body 92a, a plunger 92b, a coil spring 92c, a coil 92d, and a core 92i. The valve body 92a, the plunger 92b, the coil spring 92c, the coil 92d, and the core 92i are substantially identical in structure or operation with the valve body 91a, the plunger 91b, the coil spring 91c, the coil 91d, and the core 91i of the first solenoid valve 91, and explanation thereof in detail will be omitted here.

The coil spring 92c is, as can be seen in FIG. 8B, disposed so as to urge the plunger 92b away from the valve seat 92e. The core 92i is installed close to the inlet 92j within the valve body 92a and faces the armature 92g. When the coil 92d is placed in a deenergized state, the coil spring 92c works to keep the valve body 92f away from the valve seat 92e, thereby opening the fluid path connecting the inlet 92i and the outlet 92k in the valve body 92a. When the coil 92d is energized, it will produce a magnetic attraction to pull the armature 92g to the core 92i, so that the plunger 92b moves toward the inlet 92j, and the valve body 92f hermetically rides on the valve seat 92e. This blocks the fluid communication between the inlet 92j and the outlet 92k. As apparent from the above discussion, the second solenoid vale 92 is an electromagnetic relief valve working to control the pressure of brake fluid to be relieved therefrom as a function of an amount of electric current supplied to the coil 92d.

When a collision avoidance braking mode, as will be described later in detail, is entered, the ECU 6 closes the second solenoid valve 92, thereby hermetically closing the pilot chamber 12x which leads to the reservoir 19, that is, blocking the fluid communication between the pilot chamber 12x and the reservoir 19. Subsequently, the ECU 6 opens the first solenoid valve 91, so that the brake fluid whose pressure is adjusted by the first solenoid valve 91 to the pilot pressure, as clearly illustrated in FIG. 13, flows into the pilot chamber 12x through the hydraulic pressure supply port 11z, the sixth port 11g, the second inner port 12e, the flow path 12y, and the fluid flow path 12n. The brake fluid, as adjusted to the pilot pressure, then flows to the pilot-pressure induction path 23x and to the retaining cavity 33c of the retaining piston 33. The pilot pressure then acts on the rear end surface of the in-cylinder portion 23a of the spool piston 23. This causes a drive force (i.e., a hydraulic pressure), created by the product of the pilot pressure and a transverse sectional area (i.e., a sealing area) of the spool piston 23, to be exerted on the spool piston 23, so that the spool piston 23 moves forward to achieve the pressure-increasing mode, as described already, thereby developing the servo pressure in the servo chamber 10c.

When a total force that is a combination of a returning force, as derived by multiplying the servo pressure by the transverse sectional area (i.e., the sealing area) of the spool piston 23, and the spring pressure, as created by the spool spring 25, is balanced with the drive force, as derived by multiplying the pilot pressure by the transverse sectional area of the spool piston 23, the spool piston 23 moves to the pressure-holding position to achieve the pressure-holding mode. When the pilot pressure drops, so that the total force that is a combination of the returning force and the spring pressure of the spool spring 25 exceeds the above drive force, the spool piston 23 moves backward to the pressure-reducing position, as illustrated in FIG. 3, to establish the pressure-reducing mode, so that the servo pressure in the servo chamber 10c drops. In this way, the pilot pressure and the servo pressure bear a proportional relation according to the movement of the spool piston 23.

Figure 13:
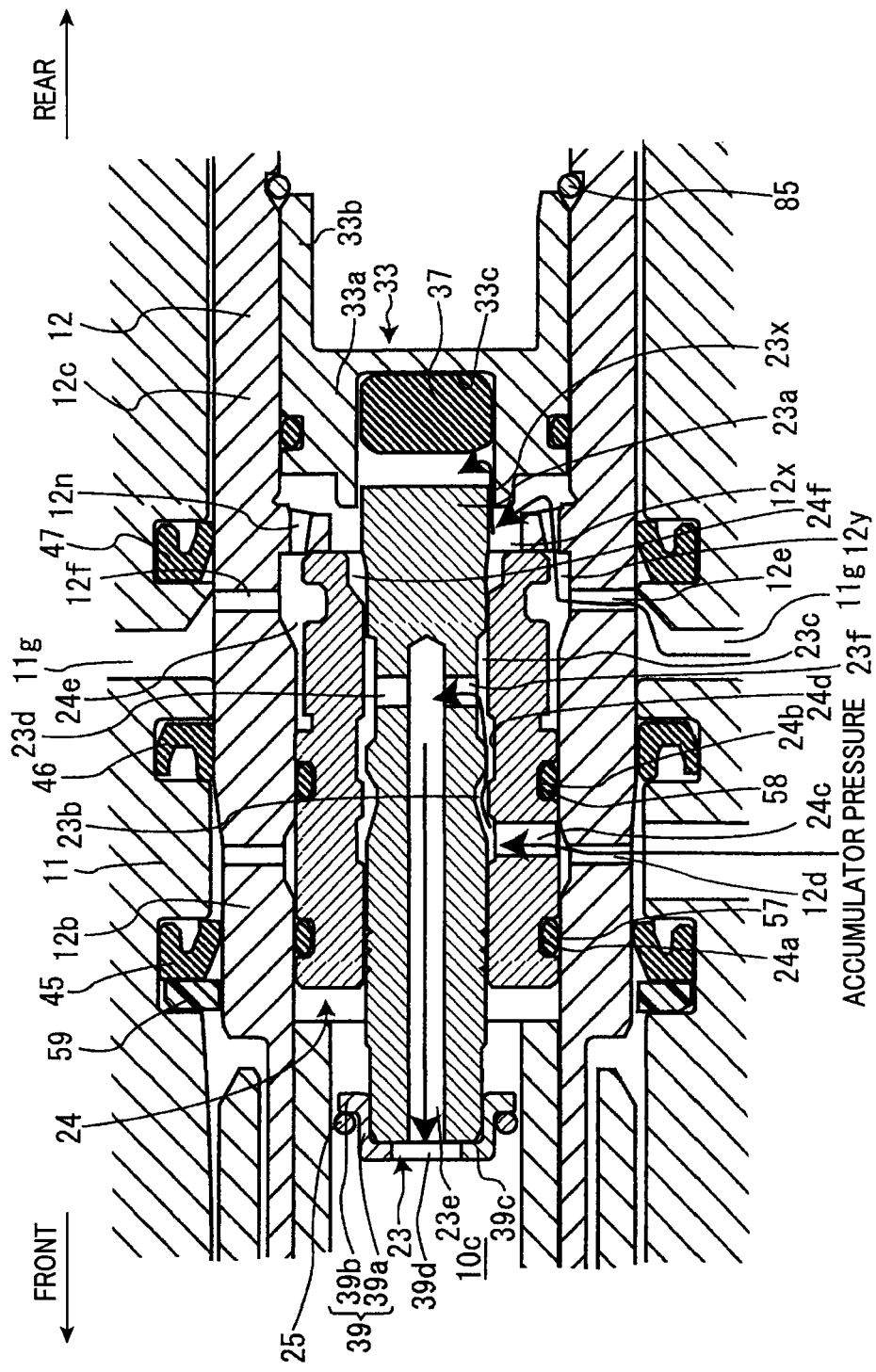
FIG. 13 is an enlarged view of a spool piston and a spool cylinder of a hydraulic booster of the braking apparatus of FIG. 2 in a collision avoidance braking mode.

When the pilot pressure is admitted into the pilot chamber 12x, it urges the pressure-holding piston 33, as clearly illustrated in FIG. 13, backward until it contacts with the C-ring 85. The C-ring 85, as described above, works as a stopper to hold the retaining piston 33 from sliding backward, thereby eliminating a change in sense of depression of the brake pedal 71, as resulting from the backward movement of the pressure-holding piston 33, which the driver of the vehicle feels.

The pressure sensor 99 is disposed in the pipe 68 between the first solenoid valve 91 and the hydraulic pressure supply port 11g and works to measure the pressure of the brake fluid in the pipe 68, i.e., the pilot pressure inducted into the pilot chamber 12x and output a signal indicative thereof to the ECU 6.

Collision Avoidance Braking

The collision avoidance braking task to be executed by the brake ECU 6 to achieve the collision braking mode will be described below with reference to a flowchart of FIG. 9. The brake ECU 6 works as a collision avoidance controller. When the system vehicle is enabled to run, the brake ECU 6 enters the collision avoidance braking mode and initiates the program of FIG. 9.

After entering the program, the routine proceeds to step S111 wherein the brake ECU 6 analyzes the outputs from the obstacle detector 97 to determine whether an obstacle exists frontward in a direction in which the system vehicle is heading or not.

If a NO answer is obtained in step S111, the routine repeats the operation in step S111. Alternatively, if a YES answer is obtained, then the routine proceeds to step S112 wherein the brake ECU 6 analyzes the outputs from the obstacle detector 97 and the wheel speed sensors Sfl, Sfr, Srl, and Srr and determines whether there is a possibility that the system vehicle will collide with the obstacle or not. If a NO answer is obtained, then the routine returns back to step S111. Alternatively, if a YES answer is obtained, then the routine proceeds to step S113.

Figure 12:
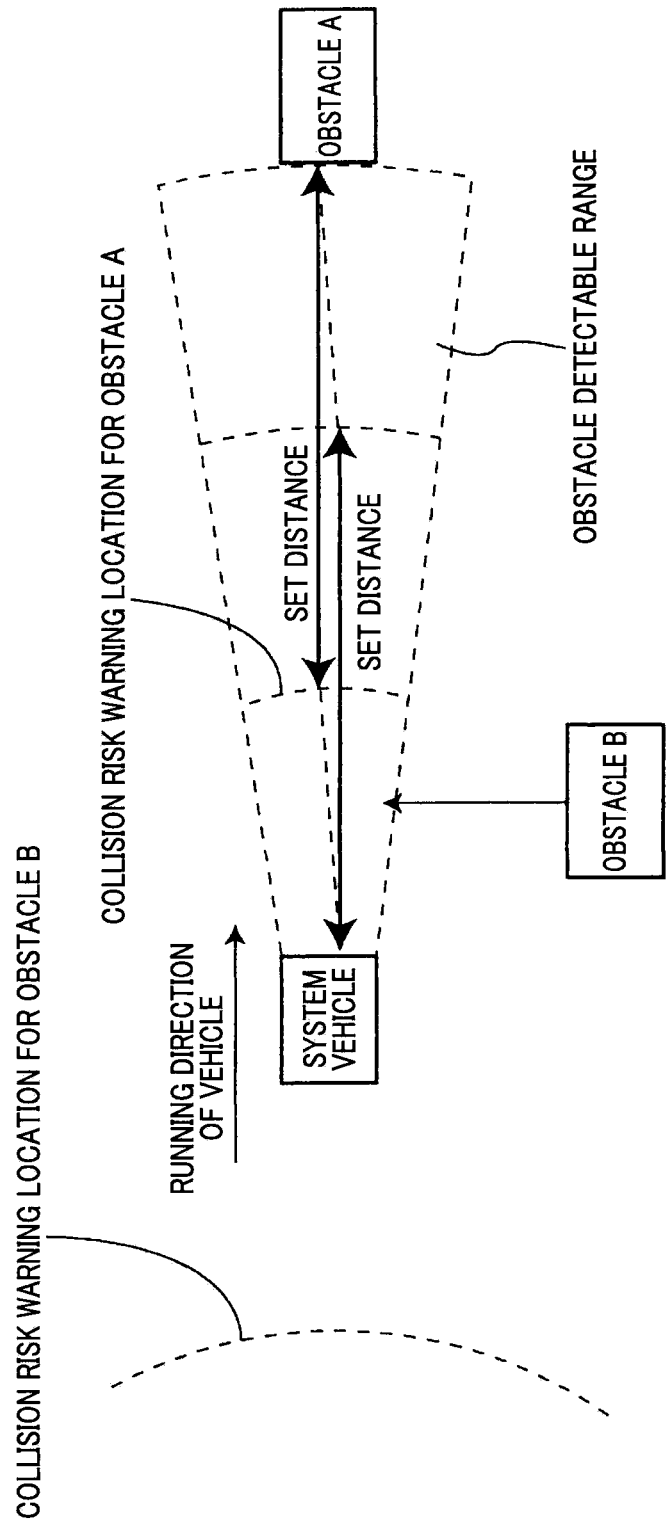
FIG. 12 is a view which represents a relation among a vehicle equipped with the braking apparatus of FIG. 2, an obstacle, a detectable range of an obstacle detector, and a collision risk warning location.

In step S113, the brake ECU 6 analyzes the outputs from the obstacle detector 97 and the wheel speed sensors Sfl, Sfr, Srl, and Srr to determine whether the speed V of the system vehicle is lower than or equal to a first reference speed (e.g., 30 km/h) or not and whether the system vehicle is running ahead of a collision risk warning location, as illustrated in FIG. 12, or not. If a YES answer is obtained meaning that the system vehicle is faster than the first reference speed and exists between the obstacle and the collision risk warning location, then the routine proceeds to step S121. Alternatively, if a NO answer is obtained meaning that at least one of the above conditions is not satisfied, then the routine proceeds to step S131. The collision risk warning location is, as illustrated in FIG. 12, defined as where the system vehicle will collide with an obstacle, as tracked by the obstacle detector 97, unless the system vehicle is decelerated at a given rate of, for example, 5 m/s² or more when the obstacle is within a radar range (i.e., an obstacle detectable range) of the obstacle detector 97. For instance, if an obstacle B which has been out of a radar-detectable range in front of the system vehicle, as indicated by a broken line in FIG. 12, appears, as represented by an arrow in FIG. 12, within a set distance from the system vehicle in the radar-detectable range, the brake ECU 6 determines that the system vehicle is closer to the obstacle B than the collision risk warning location is, in other words, that the system vehicle is now between the collision risk warning location and the obstacle B. The set distance is a distance between an obstacle A and the collision risk warning location at the time when the obstacle detector 97 detects the obstacle A for the first time.

Figure 10A:
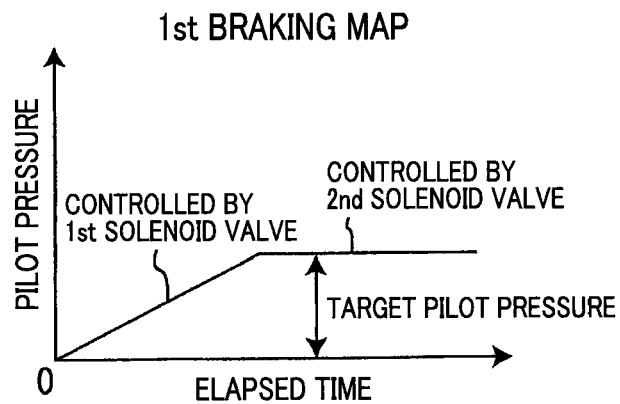
FIG. 10A is a view which represents a first braking map for use in controlling a braking force in a collision avoidance braking mode.
Figure 10B:
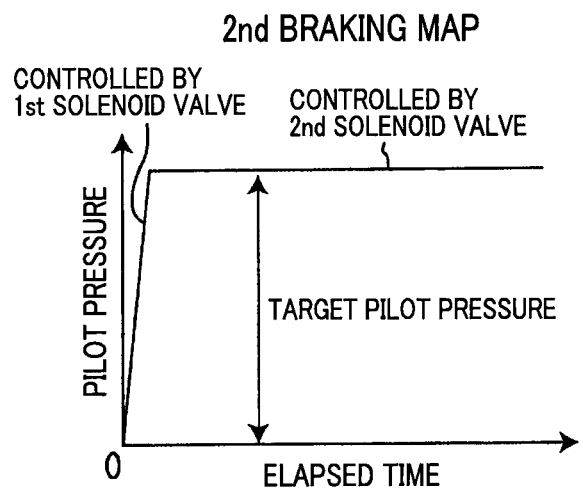
FIG. 10B is a view which represents a second braking map for use in controlling a braking force in a collision avoidance braking mode.

In step S121 the brake ECU 6 selects a second braking map, as illustrated in FIG. 10B, for use in the collision avoidance braking mode. The second braking map is made so that the level of the pilot pressure will reach a target pilot pressure quickly. Specifically, the second braking map sets a rate of increase in the pilot pressure after the system vehicle starts to be braked to be greater than that in a first braking map of FIG. 10A. The target pilot pressure, as set in the second braking map, is higher than that in the first braking map of FIG. 10A. After step S121, the routine proceeds to step S122 wherein the brake ECU 6 actuates the warning device 98 to inform the driver of the collision risk. The routine then proceeds to step S151.

If a NO answer is obtained in step S113, then the routine proceeds to step S131 wherein it is determined whether the speed V of the system vehicle is lower than a second reference speed (e.g., 60 km/h) or not using outputs from the wheel speed sensors Sfl, Sfr, Srl, and Srr. If a YES answer is obtained meaning that the speed V is lower than the second reference speed, then the routine proceeds to step S132. Alternatively, if a NO answer is obtained meaning that the speed V is higher than or equal to the second reference speed, then the routine proceeds to step S133. The second reference speed is set greater than the first reference speed used in step S113.

In step S132, the brake ECU 6 selects the first braking map in FIG. 10A. The first braking map is prepared to have a target pilot pressure lower than that in the second braking map. The first braking map is also prepared to have a rate at which the pilot pressure is increased after the system vehicle starts to be braked to be smaller than in the second braking map of FIG. 10B. After step S132, the routine proceeds to step S142.

Figure 10C:
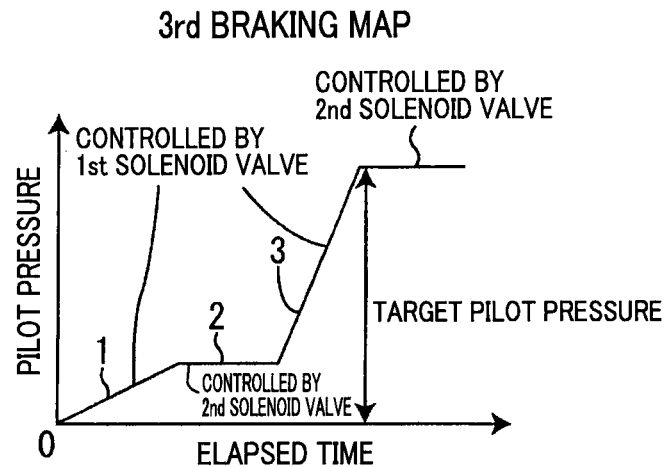
FIG. 10C is a view which represents a third braking map for use in controlling a braking force in a collision avoidance braking mode.

In step S133, the brake ECU 6 selects the third braking map in FIG. 10C. The third braking map is made so that the pilot pressure is first increased at a lower rate along a line 1, kept constant for a given period of time along a line 2, and then increased at a higher rate along a line 3 to the target pilot pressure. The rate of increase in the pilot pressure along the line 3 is set greater than that along the line 1. After step S133, the routine proceeds to step S142.

In step S142, the brake ECU 6 analyzes the output from the obstacle detector 97 and determines whether the system vehicle has reached the collision risk warning location or not. If a NO answer is obtained, the routine repeats step S142. Alternatively, if a YES answer is obtained, the routine proceeds to step S143.

In step S143, the brake ECU 6 actuates the warning device 98 to inform the driver of the collision risk.

The routine proceeds to step S144 wherein the brake ECU 6 monitors the output from the brake sensor 72 and determines whether the driver of the system vehicle has depressed the brake pedal 71 within given period of time (e.g., several seconds) from the initiation of the operation in step S143 or not. If a YES answer is obtained, the routine returns back to step S111. Alternatively, if a NO answer is obtained, then the routine proceeds to step S145.

In step S145, the brake ECU 6 determines whether the system vehicle has reached a collision avoidance braking start location, as illustrated in FIG. 11, or not. If a YES answer is obtained, then the routine proceeds to step S151. Alternatively, if a NO answer is obtained meaning that the system vehicle has not yet reached the collision avoidance braking start location, then the routine returns back to step S143. The collision avoidance braking start location is a location that is the sum of a collision avoidance interval and the braking distance of the system vehicle away from the location of the obstacle being now tracked by the obstacle detector 97 toward the system vehicle. The collision avoidance interval is an interval between the obstacle and the system vehicle when the collision with the obstacle is expected to have been avoided, that is, the speed of the system vehicle relative to the obstacle is expected to be decreased to zero. The collision avoidance interval depends upon a current speed of the system vehicle relative to the obstacle. For instance, when the current relative speed of the system vehicle to the obstacle is lower than 8 km/h, the collision avoidance interval is set to 1 m. When the current relative speed of the system vehicle to the obstacle is higher than or equal to 8 km/h, the collision avoidance interval is increased in proportion to the current relative speed of the system vehicle. The braking distance is calculated using the current relative distance between the system vehicle and the obstacle, the relative speed of the system vehicle to the obstacle, and a selected one of the first to third braking maps.

In step S151, the brake ECU 6 controls the operations of the first solenoid valve 91 and the second solenoid valve 92 so as to bring the pilot pressure, as measured by the pressure sensor 99, into agreement with the target pilot pressure at a rate, as specified in a selected one of the first to third braking maps, in the feedback control mode to initiate collision avoidance braking. Specifically, the brake ECU 6 actuates the second solenoid valve 92 in the closing direction and also actuates the first solenoid valve 91 in the open direction. The rate of increase in the pilot pressure is controlled by the first solenoid valve 91. The target pilot pressure (i.e., a target braking force) is created by the second solenoid valve 92. When the deceleration of the system vehicle, as derived by the acceleration sensor 96 after the start of the collision avoidance braking, deviates from that, as calculated in a selected one of the first to third braking maps, the brake ECU 6 works to control the operations of the first solenoid valve 91 and the second solenoid valve 92 to regulate the pilot pressure so as to bring the deceleration, as measured by the acceleration sensor 96, into agreement with the calculated deceleration. After step S151, the routine proceeds to step S152.

In step S152, the brake ECU 6 analyzes the output from the obstacle detector 97 to determine whether the risk of collision of the system vehicle with the obstacle has been eliminated or not. If a YES answer is obtained meaning that the collision with the obstacle has been avoided, then the routine returns back to step S111. Alternatively, if a NO answer is obtained, the routine repeats step S152.

Frictional Brake Unit in Second Embodiment

Figure 14:
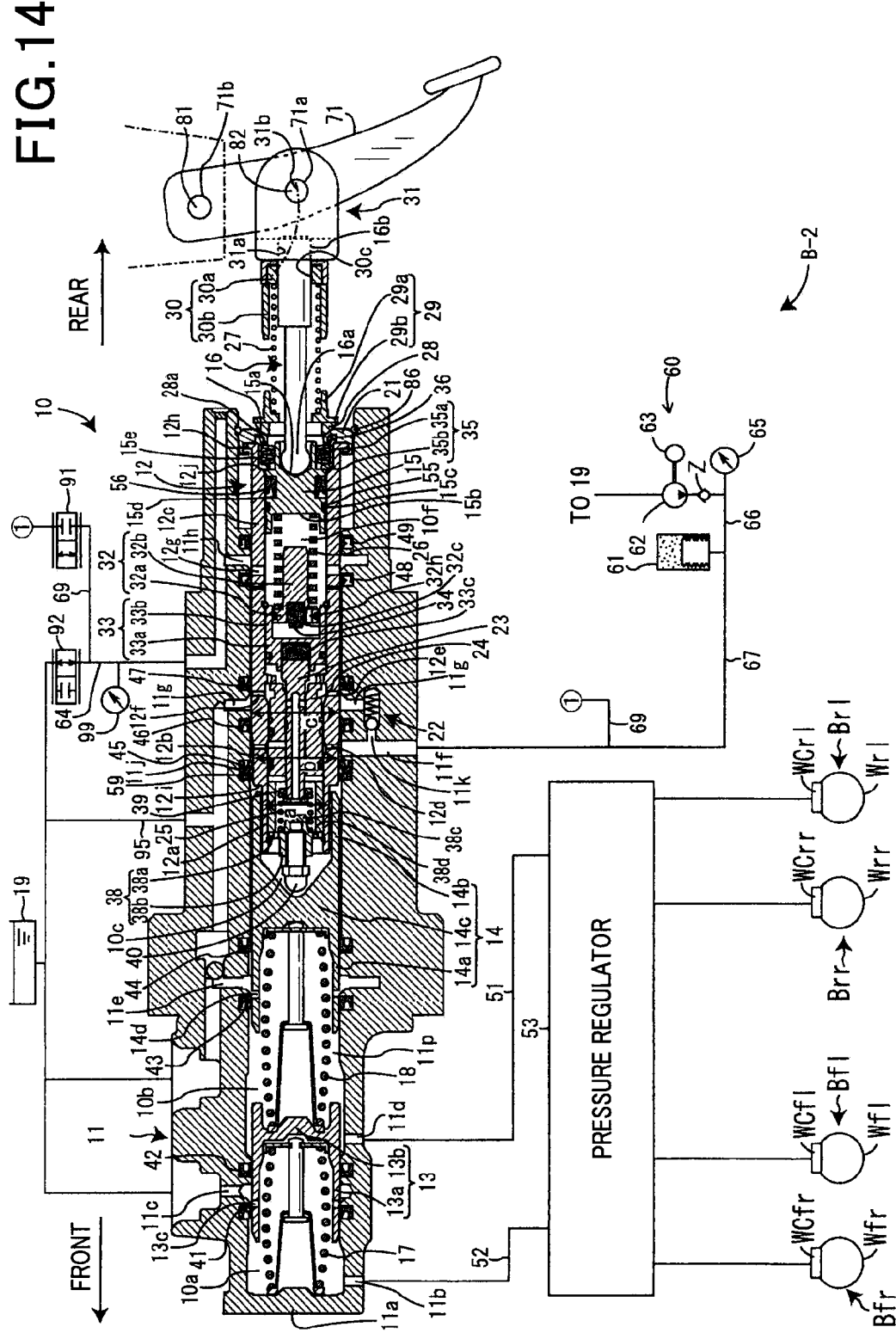
FIG. 14 is a partially longitudinal sectional view which illustrates a braking apparatus according to the second embodiment.

FIG. 14 illustrates a frictional brake unit B-2 (i.e., a brake system) of the second embodiment. The same reference numbers as employed in the first embodiment will refer to the same parts, and explanation thereof in detail will be omitted here.

The second solenoid valve 92 is installed in the flow path 64 which connects the reservoir 19 and the seventh port 11h. In other words, the second solenoid valve 92 is disposed in a flow path extending between the simulator chamber 10f and the reservoir 19. The first solenoid valve 91 is disposed in the flow path 69 which connects between a portion of the flow path 64 which is closer to the seventh port 11h than the second solenoid valve 92 is and the flow path 67. In other words, the first solenoid valve 91 is arranged in a flow path extending between the simulator chamber 10f and the accumulator 61.

When the collision avoidance braking mode is entered, the ECU 6 closes the second solenoid valve 92, thereby hermetically closing the simulator chamber 10f which leads to the reservoir 19, that is, blocking the fluid communication between the simulator chamber 10f and the reservoir 19. Subsequently, the ECU 6 opens the first solenoid valve 91, so that the brake fluid whose pressure is adjusted by the first solenoid valve 91 to the pilot pressure flows into the simulator chamber 10f through the flow paths 69 and 64, the seventh port 11h, and the fourth inner port 12g. This causes the pilot pressure to act on the pressure-holding piston 33, so that the pressure-holding piston 33 and the spool piston 23 move forward to achieve the pressure-increasing mode, as described already, thereby developing the servo pressure in the servo chamber 10c. The pilot pressure and the servo pressure bear a proportional relation.

The pressure sensor 99 is disposed in the flow path 64 between the second solenoid valve 92 and the simulator chamber 10f and works to measure the pressure of the brake fluid in the flow path 64, the pilot pressure inducted into the simulator chamber 10f and output a signal indicative thereof to the ECU 6.

Figure 9:
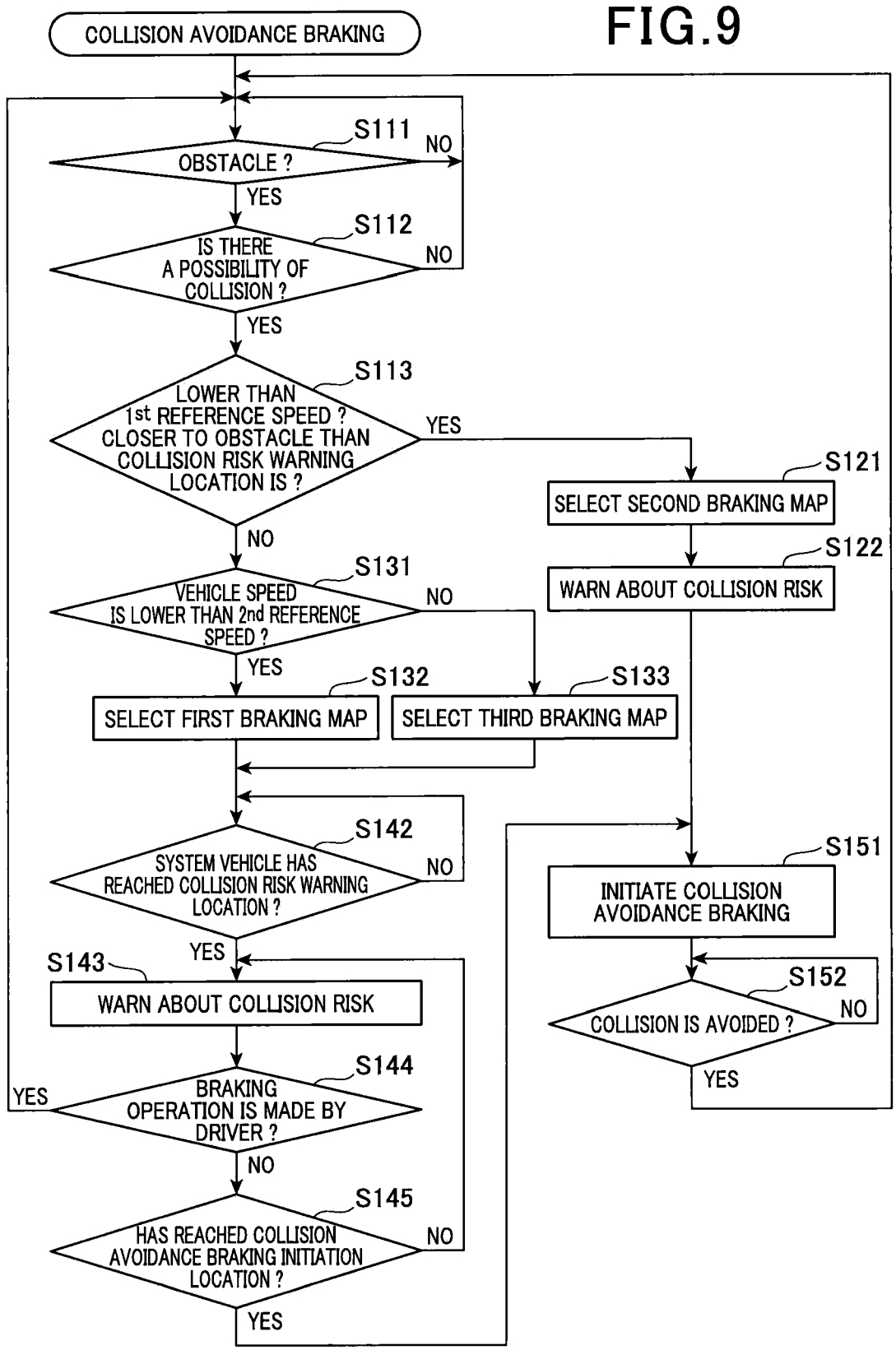
FIG. 9 is a flowchart of a collision avoidance control program to be executed by the braking apparatus of FIG. 1.

The frictional brake unit B-2 of the second embodiment is, as apparent from the above, engineered to perform substantially the same emergency braking operation as that in FIG. 9.

Beneficial Advantage of Brake System

As apparent from the above discussion, if it is determined that there is a risk of collision with an obstacle present ahead of the system vehicle (i.e., YES in steps S112 in FIG. 9), the brake ECU 6 opens the first solenoid valve 91 which is designed to switch between a pressure exerting mode in which the hydraulic pressure of the brake fluid stored in the accumulator 61 (i.e., the accumulator pressure) is exerted on the spool piston 23 as the pilot pressure and a non-pressure exerting mode in which the hydraulic pressure of the brake fluid stored in the accumulator 61 is not exerted on the spool piston 23. When the first solenoid valve 91 is opened, so that the pressure-exerting mode is entered, it will cause the spool piston 23 to be moved to a location where the pressure-increasing mode is established, thereby developing the braking force in the friction braking devices Bfl, Bfr, Brl, and Brr. Basically, the emergency braking is achieved by installing the first solenoid valve 91 to selectively exert the accumulator pressure on the spool piston 23, thus allowing an emergency avoidance braking system to be constructed with a minimum of equipment and facilitating the mountability of the frictional brake unit B or B-2 in automotive vehicles.

Further, if it is determined that there is a risk of collision with an obstacle present ahead of the system vehicle (i.e., YES in step S112 in FIG. 9), the brake ECU 6 closes the normally open type of second solenoid valve 92 (i.e., step S151) to hermetically close the pilot chamber 12x or the simulator chamber 10f, so that the pilot pressure is developed in the pilot chamber 12x or the simulator chamber 10f, thereby ensuring the stability in creating the braking force in the collision avoidance braking mode.

The first solenoid valve 91 is implemented by a linear electromagnetic valve which is capable of regulating the flow rate of brake fluid following therethrough, thus enabling, as illustrated in FIGS. 10A to 10C, a rate of increase in the pilot pressure, that is, a rate of increase in braking force applied to the wheels Wfl, Wfr, Wrl, and Wrr to be regulated linearly. The second solenoid valve 92 is also implemented by a linear electromagnetic valve which is capable of regulating the hydraulic pressure of the brake fluid, thus enabling, as illustrated in FIGS. 10A to 10C, the target pilot pressure, that is, the target braking force required to be applied to the wheels Wfl, Wfr, Wrl, and Wrr to be regulated linearly.

Figure 15A:
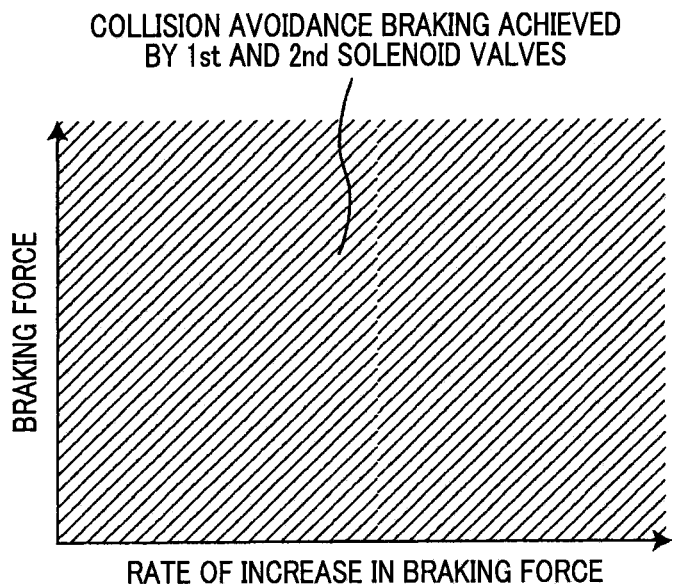
FIG. 15A is a view which illustrates a relation between a braking force and a rate of increase in braking force in the braking apparatuses of FIGS. 2 and 14.
Figure 15B:
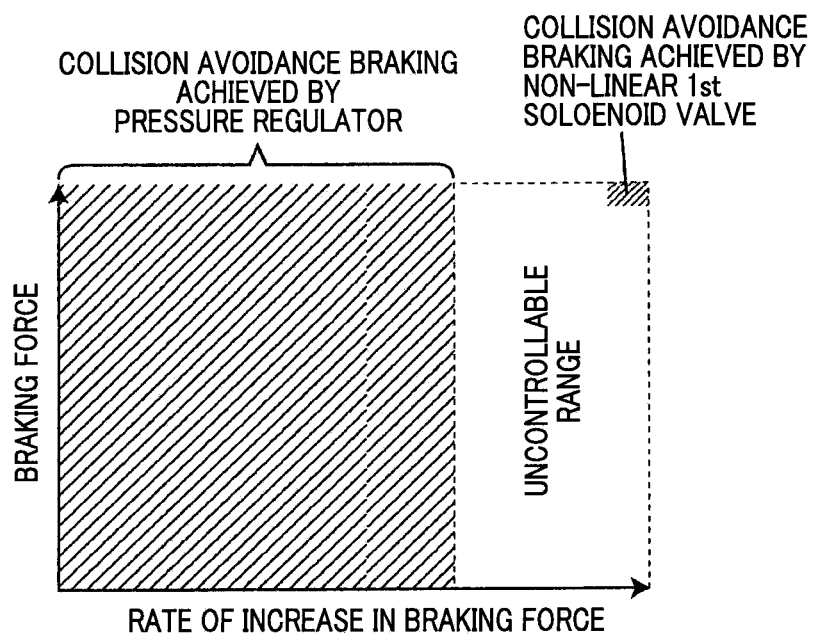
FIG. 15B is a view which illustrates a relation between a braking force and a rate of increase in braking force in a frictional brake unit equipped with a pressure regulator and non-linear electromagnetic type first and second solenoid valves.

If the collision avoidance braking is established by a combination of the pressure regulator 53 and the first and second solenoid valves 91 and 92 which are both designed by a non-linear electromagnetic valve, an uncontrollable range will be created which is, as illustrated in FIG. 15B, a range where it is impossible to control the rate of increase in braking force and the target braking force. Specifically, the frictional brake unit B or B-2 works to open the first solenoid valve 91 fully in the emergency braking operation, so that the accumulator pressure is inputted directly to the pilot chamber 12x or the simulator chamber 10f, thus resulting in a sharp rise in the braking force, in other words, the frictional brake unit B or B-2 is incapable of controlling or regulating the rate of increase in the braking force. Additionally, the frictional brake unit B or B-2 also closes the second solenoid valve 92 fully in the emergency braking operation, that is, it is incapable of controlling the target braking force.

Further, when it is required to brake the system vehicle in a slow braking mode, the pressure regulator 53 is capable of producing the braking force, but incapable of elevating the braking force rapidly because the rate of increase in the braking force depends upon the performance of the pump or the motor of the pressure regulator 53. The frictional brake unit B or B-2 of the above embodiment is, however, equipped with the first and second solenoid valves 91 and 92 implemented by a linear electromagnetic valve and, thus, have the capability of regulating the rate of increase in braking force and the target braking force, as illustrated in FIG. 15A. In other words, the frictional brake unit B or B-2, therefore, does not have the uncontrollable range shown in FIG. 15B.

The frictional brake unit B of the first embodiment has the pilot chamber 12x formed in the master cylinder 11. The pilot chamber 12x serves to apply the pilot pressure to the spool piston 23. The first solenoid valve 91 is disposed in the flow path 68 connecting between the accumulator 61 and the pilot chamber 12x. This ensures the stability in exerting the pilot pressure on the spool piston 23. The frictional brake unit B, thus, works to advance the spool piston 23 properly to generate the servo pressure required to create the braking force in the collision avoidance braking mode.

The frictional brake unit B-2 of the second embodiment is designed to have the first solenoid valve 91 disposed in a flow path, as defined by flow paths 69 and 64, which connects between the accumulator 61 and the simulator chamber 10f, thereby enabling the pilot pressure to be exerted on the spool piston 23 through the pressure-holding piston 33. The frictional brake unit B-2, thus, works to advance the spool piston 23 properly to generate the servo pressure required to create the braking force in the collision avoidance braking mode.

The frictional brake unit B or B-2 selects one of the first to third braking maps, as illustrated in FIGS. 10A to 10C, depending upon the speed of the system vehicle and/or whether an obstacle has appeared within the set distance in front of the system vehicle, and controls the operations of the first solenoid valve 91 and the second solenoid valve 92 according to the selected one of the first to third braking maps, thus enabling the system vehicle to be decelerated desirably.

Specifically, when it is determined that the speed V of the system vehicle is lower than or equal to the first reference speed and that an obstacle has appeared the set distance ahead of the system vehicle (i.e., YES in step S113 of FIG. 9), the brake ECU 6 selects the second braking map of FIG. 10B and increases the braking force sharply to a higher level, thereby avoiding the risk of a collision with the obstacle appearing suddenly in front of the system vehicle. Alternatively, when it is determined that that the speed V of the system vehicle is higher than the first reference speed, the brake ECU 6 does not select the second braking map, thus avoiding instability of behavior of the system vehicle which typically arises from a sudden increase in the braking force.

When the speed V of the system vehicle is greater than or equal to the second reference speed (i.e., YES in step S131 of FIG. 9), the brake ECU 6 selects the third braking map of FIG. 10C and increases the braking force at a lower rate along the line 1 in FIG. 10C at an initial stage of the emergency braking operation in order to ensure the stability of behavior of the system vehicle and also minimize the risk of a collision with another vehicle trailing the system vehicle. Subsequently, the brake ECU 6 keeps the braking force at a constant level along the line 2 in FIG. 10C and continues to decelerate the system vehicle. Finally, the brake ECU 6 increases the braking force again at a higher rate along the line 3 in FIG. 10C to eliminate the risk of a collision with the obstacle completely without sacrificing the stability of behavior of the system vehicle.

Alternatively, when it is determined that the speed V of the system vehicle is lower than the second reference speed (i.e., YES in step S131 of FIG. 9), the brake ECU 6 selects the first braking map of FIG. 10A and increases the braking force slowly to a level lower than those in FIGS. 10B and 10C, thereby braking the system vehicle without giving the driver of the system vehicle a sense of hazard.

The simulator spring 26, as described above, urges the input piston 15 backward to function as a brake simulator which applies a reaction force to the brake pedal 71 to imitate an operation of a typical brake system. The simulator spring 26 is disposed inside the cylindrical cavity 11p of the master cylinder 11 of the hydraulic booster 10. In other words, the master pistons 13 and 14, the spool valve (i.e., the spool cylinder 24 and the spool piston 23), the simulator spring 26, and the input piston 15 are arranged in alignment with each other (i.e., in series with each other) within the cylindrical cavity 11p of the master cylinder 11. This layout facilitates the ease with which the frictional brake unit B or B-2 is mounted in the vehicle.

The simulator rubber 34 is disposed away from the retaining piston 33 which supports the spool piston 23. This layout keeps the braking effort applied to the brake pedal 71 from being transmitted to the spool piston 23 until the simulator rubber 34 retained by the movable member 32 contacts the retaining piston 33. In other words, the frictional braking force is not created immediately after the depression of the brake pedal 71. After the braking effort exceeds the regenerative braking force generating level P1, as shown in the graph of FIG. 5, the regenerative braking system A starts developing the regenerative braking force. This minimizes the dissipation of thermal energy, into which kinetic energy of the vehicle is converted, from the friction braking devices Bfl, Bfr, Brl, and Brr, thereby enhancing the efficiency in using the kinetic energy of the vehicle as the regenerative braking force through the regenerative braking system A.

The movable member 32 which is disposed behind the spool valve between the retaining piston 33 and the input piston 15 serves as a stopper to restrict the frontward movement of the input piston 15 upon depression of the brake pedal 71, thereby avoiding damage to the simulator spring 26.

The frictional brake unit B and B-2 are engineered so as to switch among the pressure-reducing mode, the pressure-increasing mode, and the pressure-holding mode according to the longitudinal location of the spool piston 23, as moved in response to the braking effort on the brake pedal 71, within the spool cylinder 24. In other words, the frictional braking force is variably developed by the spool valve that is a mechanism made up of the spool piston 23 and the spool cylinder 24. This enables the frictional braking force to be changed more linearly than the case where the frictional braking force is regulated using a solenoid valve.

Specifically, in the case of use of the solenoid valve, a flow of brake fluid usually develops a physical force to lift a valve away from a valve seat when the solenoid valve is opened. This may lead to an excessive flow of the brake fluid from the solenoid valve, thus resulting in an error in regulating the pressure of the brake fluid and instability in changing the frictional braking force. In order to alleviate such a drawback, the brake system B is designed to have the spool piston 23 on which the driver's effort on the brake pedal 71 is exerted and switch among the pressure-reducing mode, the pressure-increasing mode, and the pressure-holding mode as a function of a change in the driver's effort, thereby developing the frictional braking force according to the driver's intention.

The damper 37 is, as illustrated in FIG. 3, installed between the retaining cavity 33c of the retaining piston 33 and the rear end surface of the spool piston 23. The damper 37 is deformable or compressible to attenuate or absorb the impact which results from a sudden rise in pressure in the servo chamber 10c and is transmitted from the spool piston 23 to the retaining piston 33, thus reducing the impact reaching the brake pedal 71 to alleviate the discomfort of the driver.

Modifications

The braking devices (i.e., the frictional brake units B and B-2) of the above embodiments are equipped with the brake sensor 72 which measures the degree of effort applied to the brake pedal 71 in the form of the amount of stroke of the brake pedal 71, but the brake sensor 72 may be designed as a stroke sensor to measure the amount of stroke of the input piston 15, the connecting member 31 or the operating rod 16 as representing the degree of effort exerted on the brake pedal 71. The brake sensor 72 may alternatively be engineered as a load sensor to detect a degree of physical load acting on the brake pedal 71, the input piston 15, the connecting member 31, or the operating rod 16.

The braking devices (i.e., the frictional brake units B and B-2) are, as described above, mounted in the hybrid vehicle equipped with the regenerative braking system A, but the present invention (i.e., the hydraulic booster 10) may be installed in another type of vehicle with no regenerative braking system.

The braking devices (i.e., the frictional brake units B and B-2) use the brake pedal 71 as a brake actuating member which inputs or transmits the driver's braking effort to the input piston 15, but may alternatively employ a brake lever or a brake handgrip instead of the brake pedal 71. The braking devices may also be used with motorbikes or another type of vehicles.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A braking apparatus for a vehicle comprising:
a master cylinder having a length with a front and a rear, the master cylinder including a cylindrical cavity extending in a longitudinal direction of the master cylinder;
an accumulator which connects with the cylindrical cavity of the master cylinder and in which hydraulic pressure of brake fluid is stored;
a reservoir which connects with the cylindrical cavity of the master cylinder and in which the brake fluid is stored;
a master piston which is disposed in the cylindrical cavity of the master cylinder to be slidable in the longitudinal direction of the master cylinder, the master piston having a front oriented toward the front of the master cylinder and a rear oriented to the rear of the master cylinder, the master piston defining a master chamber and a servo chamber within the cylindrical cavity, the master chamber being formed on a front side of the master piston and storing therein the brake fluid to be delivered to a friction braking device working to apply a frictional braking force to a wheel of a vehicle equipped with this braking apparatus, the servo chamber being formed on a rear side of the master piston;
a spool valve which is disposed on the rear side of the master piston within the cylindrical cavity of the master cylinder to be slidable in the longitudinal direction of the master cylinder in response to an effort, as produced by a driver of the vehicle, on a brake pedal so as to switch among a pressure-reducing mode, a pressure-increasing mode, and a pressure-holding mode, the pressure-reducing mode being to establish fluid communication between the servo chamber and the reservoir, the pressure-increasing mode being to establish fluid communication between the servo chamber and the accumulator, the pressure-holding mode being to hermetically close the servo chamber;
a first solenoid valve which switches between a pressure exerting mode and a non-pressure exerting mode, the pressure exerting mode being to exert the hydraulic pressure of the brake fluid stored in the accumulator on the spool valve, the non-pressure exerting mode being not to exert the hydraulic pressure of the brake fluid stored in the accumulator on the spool valve;

a collision avoidance controller which works to determine whether there is a risk of a collision of the vehicle equipped with this braking apparatus with an obstacle or not, when it is determined that there is the risk of the collision, the collision avoidance controller opening the first solenoid valve to move the spool valve so as to establish the pressure-increasing mode for creating the frictional braking force applied to the wheel;

an input piston which is disposed behind the spool valve within the cylindrical cavity of the master cylinder to be slidable in the longitudinal direction of the master cylinder, the input piston defining a simulator chamber between itself and the spool valve within the cylindrical cavity and being subjected to the effort, as produced by the driver of the vehicle;

a spring which is disposed within the simulator chamber to transmit the effort, as inputted to the input piston, to the spool valve; and a second solenoid valve which is installed in a flow path between the simulator chamber and the reservoir;

wherein the first solenoid valve is disposed in a flow path connecting between the accumulator and the simulator chamber, and wherein when it is determined that there is the risk of the collision, the collision avoidance controller closes the second solenoid valve.

2. A braking apparatus as set forth in claim 1, wherein the first solenoid valve is implemented by a linear electromagnetic valve which is capable of regulating a flow rate of the brake fluid and works to create a pilot pressure from the hydraulic pressure of the brake fluid stored in the accumulator, the pilot pressure being exerted on the spool valve.

3. A braking apparatus as set forth in claim 1, wherein the master cylinder has defined therein a pilot chamber which exerts hydraulic pressure of the brake fluid on the spool valve, and wherein the first solenoid valve is disposed in a flow path connecting between the accumulator and the pilot chamber.

4. A braking apparatus as set forth in claim 3, further comprising a third solenoid valve installed in a flow path between the pilot chamber and the reservoir, and wherein when it is determined that there is the risk of the collision, the collision avoidance controller closes the third solenoid valve.

5. A braking apparatus as set forth in claim 4, wherein the second solenoid valve is implemented by a linear electromagnetic valve which is capable of regulating a flow rate of the brake fluid.

6. A braking apparatus as set forth in claim 1, wherein the second solenoid valve is implemented by a linear electromagnetic valve which is capable of regulating a flow rate of the brake fluid.

7. A braking apparatus as set forth in claim 2, wherein the collision avoidance controller controls an operation of the first solenoid valve according to a braking map which represents a relation between a time elapsed from start of braking and a level of the pilot pressure.

8. A braking apparatus as set forth in claim 7, further comprising a speed determiner which determines a speed of the vehicle, and wherein the collision avoidance controller determines the level of the pilot pressure using the braking map since the start of braking as a function of the speed of the vehicle.

9. A braking apparatus as set forth in claim 7, further comprising an obstacle detector working to detect appearance of the obstacle within a set distance in front of the vehicle, and wherein the collision avoidance controller determines the level of the pilot pressure using the braking map since the start of braking depending upon whether the obstacle has appeared within the set distance or not.

* * * * *